United States Patent [19]

Koike et al.

[11] Patent Number: 4,960,095
[45] Date of Patent: Oct. 2, 1990

[54] KNOCKING CONTROL SYSTEM FOR INTERNAL COMBUSTION ENGINES

[75] Inventors: Yuzuru Koike; Tsao Yahata, both of Wako, Japan

[73] Assignee: Honda Giken Kogyo Kabushiki Kaisha, Tokyo, Japan

[21] Appl. No.: 417,229

[22] Filed: Oct. 4, 1989

[30] Foreign Application Priority Data

Oct. 11, 1988 [JP] Japan .................................. 63-255295

[51] Int. Cl.⁵ ...................... F02D 13/02; F02D 43/00; F01L 1/34; F02P 5/15
[52] U.S. Cl. .................................... 123/425; 123/90.16
[58] Field of Search .............. 123/90.11, 90.15, 90.16, 123/90.17, 90.18, 425, 435

[56] References Cited

U.S. PATENT DOCUMENTS

| 4,844,022 | 7/1989 | Konno | 123/90.16 |
| 4,887,561 | 12/1989 | Kishi | 123/90.16 |

FOREIGN PATENT DOCUMENTS

| 49-33289 | 9/1974 | Japan . | |
| 57-30980 | 7/1982 | Japan . | |
| 0093137 | 5/1985 | Japan | 123/90.16 |
| 0190147 | 8/1986 | Japan | 123/425 |
| 0244871 | 10/1986 | Japan | 123/90.16 |

*Primary Examiner*—Willis R. Wolfe
*Attorney, Agent, or Firm*—Armstrong, Nikaido, Marmelstein, Kubovcik & Murray

[57] ABSTRACT

A knocking control system for an internal combustion engine with the inlet valves and exhaust valves having valve timing thereof controlled depending on operating conditions of the engine. It is determined whether or not knocking has occurred in the engine on the basis of a detection parameter indicative of knocking and at least one discrimination parameter. The operation of the engine is controlled by the use of at least one control parameter in response to the determination result. The values of the discrimination and control parameters arfe selected in accordance with the actual valve timing. The detection parameter is a level of vibration of the engine comprising a noise component and a knocking component. It is determined that knocking has occurred when the level of the knocking component is higher than one knocking discrimination level set based on the level of the noise component and the discrimination parameter irrespective of the actual valve timing. The discrimination parameter includes correction terms set to such values as to obtain the one knocking discrimination level, by being multiplied by and added to the level of the noise component, respectively.

18 Claims, 17 Drawing Sheets

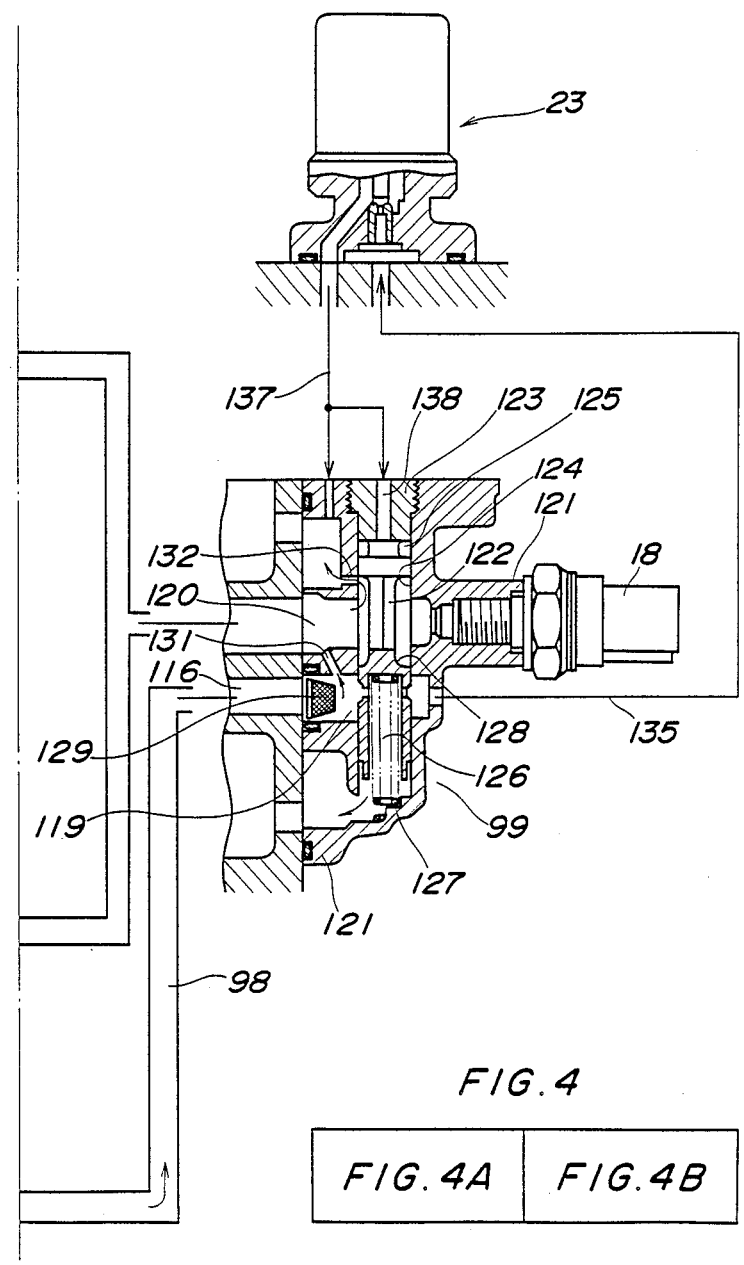

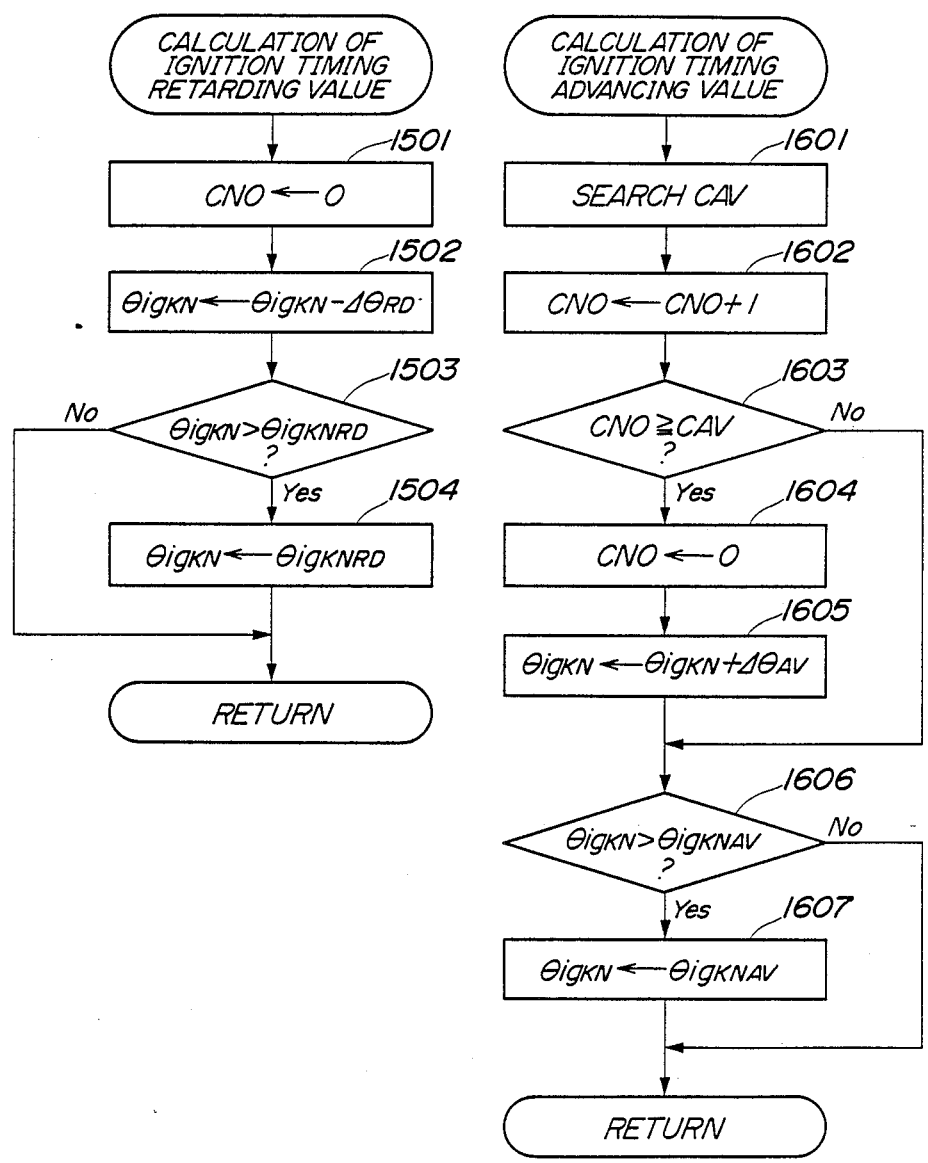

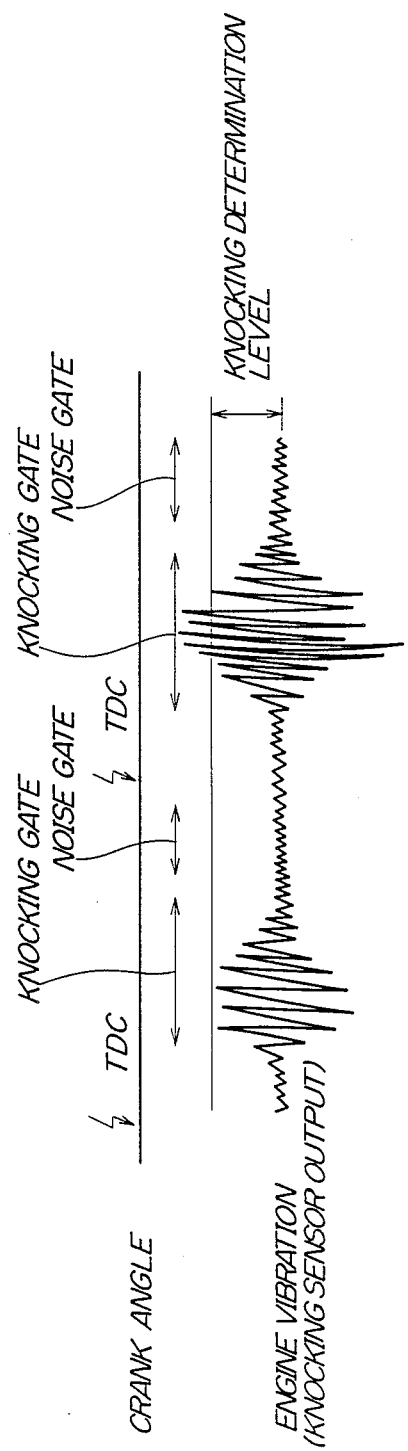

KNOCKING CONTROL SYSTEM FOR INTERNAL COMBUSTION ENGINES

BACKGROUND OF THE INVENTION

This invention relates to a knocking control system for internal combustion engines, and particularly to a system of this kind for an internal combustion engine equipped with a device which varies the opening and closing timing or lift of inlet valves and exhaust valves of the engine depending on operating conditions of the engine in order to prevent knocking.

An internal combustion engine is conventionally known, e.g. from Japanese Patent Publication (Kokoku) No. 49-33289, which is capable of changing the valve timing (valve opening period or valve lift) of inlet valves and/or exhaust valves between low speed valve timing suitable for a lower engine rotational speed region and high speed valve timing suitable for a higher engine rotational speed region, in order to enhance the charging efficiency or combustion efficiency.

Further, a control method for internal combustion engines is known, e.g. from Japanese Patent Publication (Kokoku) 57-30980, in which knocking occurring in the engine is detected, and the ignition timing is retarded upon detection of knocking to thereby eliminate the knocking.

However, if knocking control is effected in an internal combustion engine equipped with the valve timing device, there occur the following problems:

Knocking is caused by abnormal combustion within engine cylinderds. The magnitude (knocking noise level) and frequency of knocking, as well as the crank angle at which knocking occurs vary if the valve timing and/or lift of the inlet and exhaust valves and/or the compression ratio vary. Further, the noise level (background level) of the output of a knocking sensor, on the basis of which a knocking discrimination level is set, varies at the time of changeover of the valve timing when changeover of rocker arms and oil passages, etc. is effected. Also, the ignition timing at which knocking occurs and the optimal ignition timing (MBT) are different between the low speed valve timing and the high speed valve timing. Therefore, knocking is not eliminated to thereby cause damage to the engine and degraded driveability and hence marketability of same, unless the retarding amount, retarding speed, advancing amount, and advancing speed of the ignition timing are set to respective appropriate values depending on the actual valve timing when the ignition timing is retarded upon detection of knocking to eliminate same and when it is advanced after elimination of the knocking.

According to the above described conventional method, the knocking discrimination level is calculated by the use of the same equation over the entire engine rotational speed range, on the basis of the amplitude of vibration (noise level) of the engine detected by a noise gate, which is operable in a crank angle region in which knocking does not occur, as shown in FIG. 19. Then, it is determined that knocking has occurred, when the level of vibration detected by a knocking gate, which is operable in a crank angle region in which there is a possiblity of occurrence of knocking, exceeds the calculated knocking discrimination level.

However, the noise level detected by the noise gate has an inclination to increase as the engine rotational speed increases. Further, the noise level at the low speed valve timing is different from that at the high speed valve timing such that the former is higher than the latter. This is because if the low speed valve timing is selected in the higher engine rotational speed region, the gradient of the lift of a cam for driving the inlet or exhaust valve with respect to crank angle becomes very sharp and the load exerted by a rocker arm spring on a rocker arm in sliding contact with the cam becomes large, so that vibration caused by the mutually sliding cam and rocker arm increases.

Therefore, if both the knocking discrimination levels at the low and high speed valve timings are calculated by the use of the same equation as in the conventional method, the calculated results become greatly different from each other due to the difference in the noise level between the low and high speed valve timings. Further, since the noise level abruptly increases when the engine rotational speed rises above e.g. about 4800 rpm, and the increasing rate of the noise level at the low speed valve timing is larger than that at the high speed valve timing, the knocking discrimination level at the low speed valve timing in the higher engine rotational speed region becomes considerably higher than that at the high speed valve timing in the same region. Therefore, knocking, even if it occurs, cannot be positively detected at the low speed valve timing in the higher engine rotational speed region.

SUMMARY OF THE INVENTION

It is an object of the invention to provide a knocking control system for an internal combustion engine, which is capable of positively detecting occurrence of knocking in the engine irrespective of the selected valve timing.

It is a further object of the invention to provide a knocking control system for an internal combustion engine, which is capable of effecting optimum knocking control at respective valve timingboth low speed valve timing and high speed valve timing which cause different combustion characteristics.

To attain the above objects, the present invention provides a knocking control system for an internal combustion engine having inlet valves and exhaust valves, at least one of the inlet valves and the exhaust valves having valve timing thereof controlled by valve timing control means depending on operating conditions of the engine.

The system of the invention is characterized by comprising:

valve timing detecting means for detecting the valve timing controlled by the valve timing control means;

knocking parameter detecting means for detecting a detection parameter indicative of knocking occurring in the engine;

knocking discriminating means for determining whether or not knocking has occurred in the engine on the basis of the detection parameter detected by the knocking parameter means and at least one discrimination parameter;

knocking control means responsive to an output from the knocking discrimination means indicative of a determination result that knocking has occurred, for controlling an operation of the engine by the use of at least one control parameter; and parameter value selecting means for selecting a value of at least one of the at least one discrimination parameter and the at least one control parameter, which corresponds to the valve timing detected by the valve timing detecting means.

Preferably, the detection parameter detected by the knocking parameter detecting means is a level of vibration of the engine, the vibration comprising a knocking component and a noise component, the knocking discriminating means setting a knocking discrimination level on the basis of a level of the noise component and the at least one discrimination parameter, in a manner depending upon of the valve timing controlled by the valve timing control means, and determining that knocking has occurred when a level of the knocking component has a level higher than the knocking discrimination level.

More preferably, the at least one discrimination parameter includes correction terms ($G_L$, $G_H$; $OS_L$, $OS_H$) set to such values as to obtain the knocking discrimination level irrespective of the valve timing controlled by the valve timing control means, by being multiplied by and added to the level of the noise component, respectively.

Further preferably, the valve timing control means controls the valve timing to low speed valve timing suitable for a low engine rotational speed region and high speed valve timing suitable for a high engine rotational speed region, the correction terms comprising first correction terms ($G_L$, $OS_L$) for the low speed valve timing and second correction terms ($G_H$, $OS_H$) for the high speed valve timing, the parameter value selecting means selecting the first correction terms or the second correction terms depending on the valve timing detected by the valve timing detection means.

The first correction terms and the second correction terms increase as at least one of the rotational speed of the engine and load on the engine increases.

The above and other objects, features, and advantages of the invention will become more apparent from the ensuing detailed description taken in conjunction with the accompanying drawings.

BRIEF DESCRIPTION OF THE DRAWINGS

FIGS. 4, 4A, and 4B are schematic diagrams showing an oil-feeding system and an oil pressure-changeover device;

FIGS. 9, 9A, 9B and 9C are flowcharts of a program for controlling the changeover of the valve timing;

Figure 1:
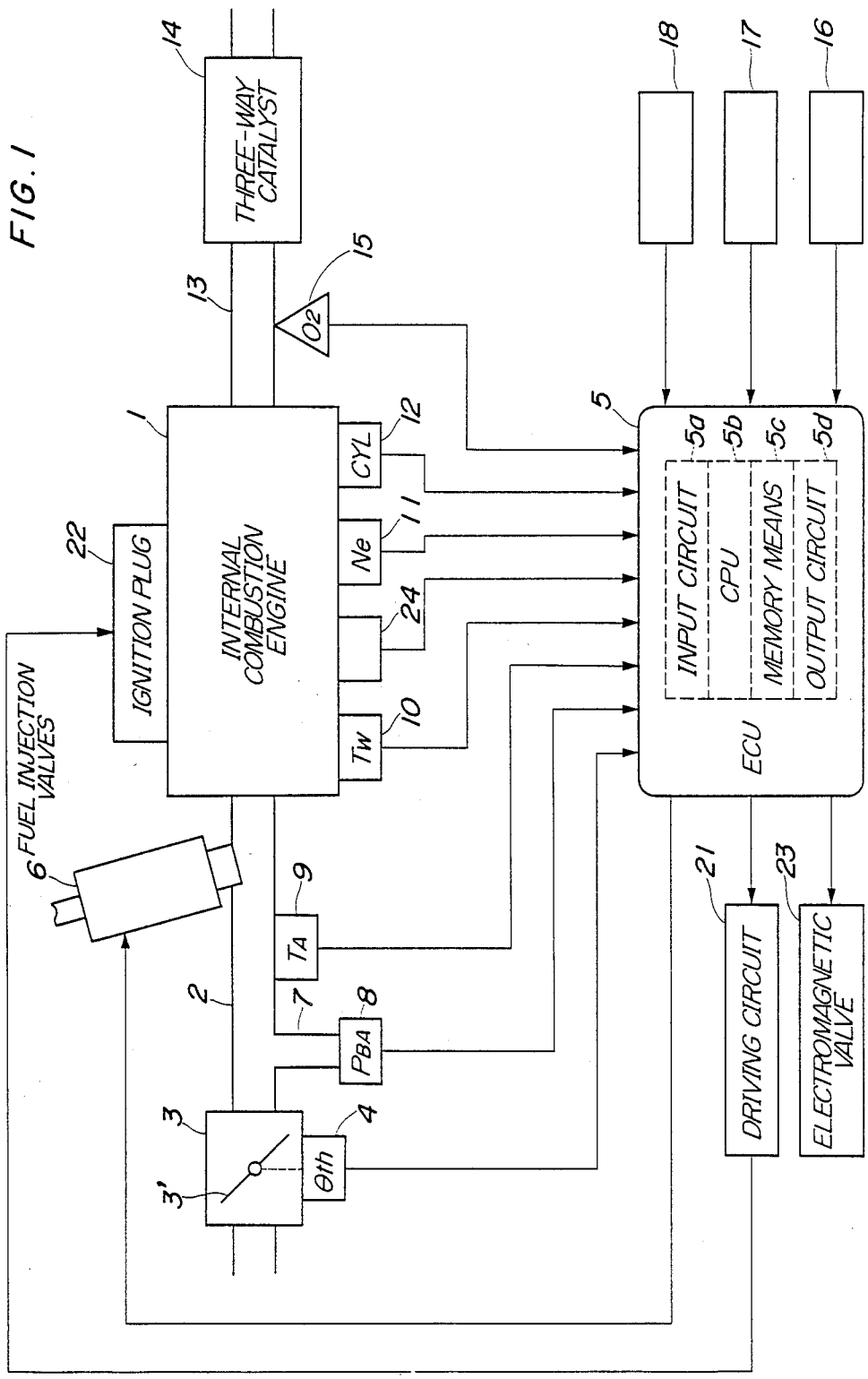
FIG. 1 is a schematic diagram showing the whole arrangement of a fuel supply control system for an internal combustion engine incorporating a knocking control system according to the invention.
Figure 13:
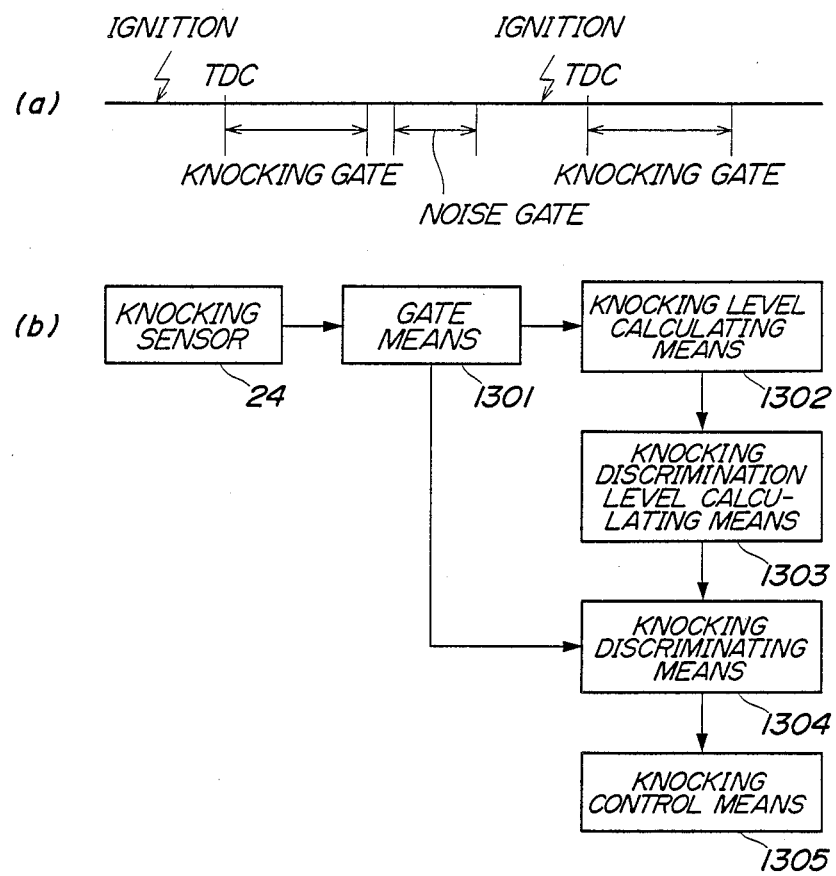
Figure 14:
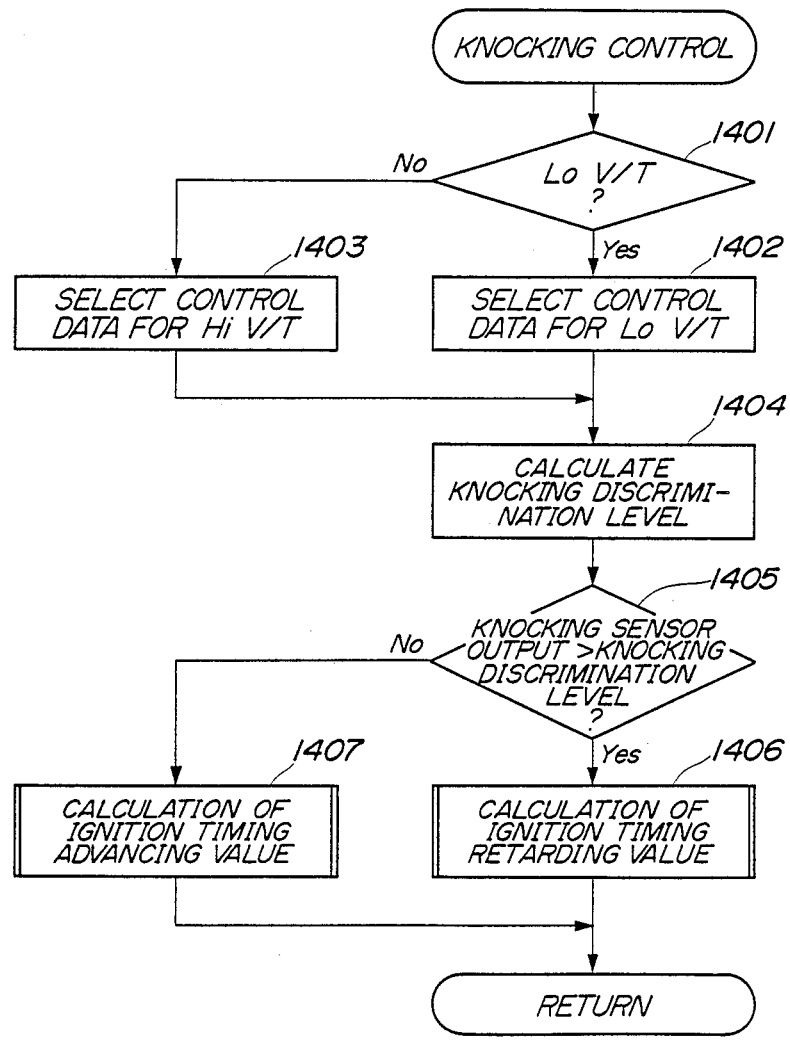
Figure 18:
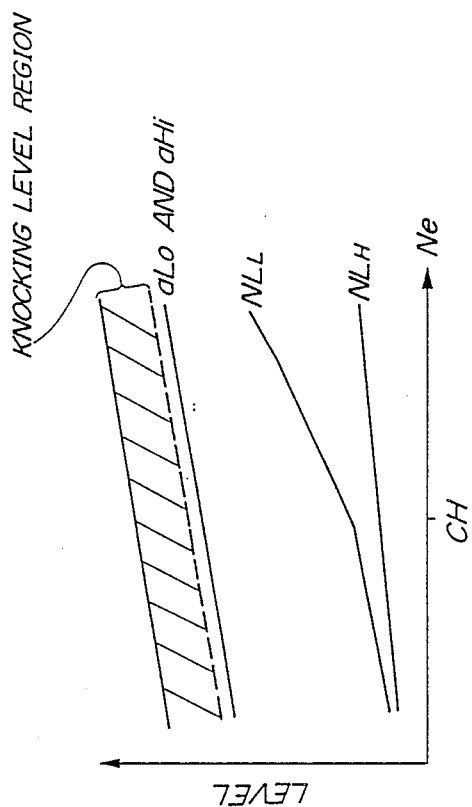
Figure 17A:
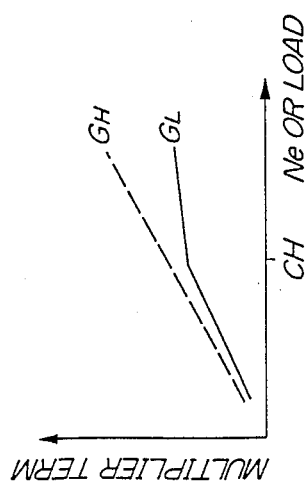
Figure 17B:
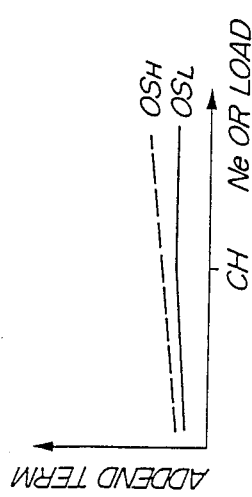

(a) and (b) of FIG. 13 are block diagrams illustrating an arrangement for determining occurrence of knocking;

FIG. 14 is a flowchart of a program for controlling knocking, which is executed in the knocking control system of the invention;

FIG. 15 is a flowchart of a subroutine corresponding to a step 1406 of the program of FIG. 14;

FIG. 16 is a flowchart of a subroutine corresponding to a step 1407 of the program of FIG. 14;

FIGS. 17A and 17B are graphs showing tables of a multiplier term and an addend term to be used for calculation of a knocking discrimination level executed at a step 1404 in FIG. 14;

FIG. 18 is a graph showing the knocking discrimination level calculated at the step 1404 in FIG. 14; and FIG. 19 is a graph showing output from a knocking sensor appearing in FIG. 1.

DETAILED DESCRIPTION

The knocking control system according to the invention will now be described in detail with reference to the drawings showing an embodiment thereof.

Referring first to FIG. 1, there is shown the whole arrangement of a fuel supply control system for an internal combustion engine incorporating the knocking control system according to the invention. In the figure, reference numeral 1 designates an internal combustion engine of DOHC in-line 4 cylinder type for automotive vehicles, in which two pairs of inlet and exhaust valves are provided for each cylinder. Connected to the cylinder block of the engine 1 is an intake pipe 2 across which is arranged a throttle body 3 accommodating a throttle valve 3' therein. A throttle valve opening ($\theta_{TH}$) sensor 4 is connected to the throttle valve 3' for generating an electric signal indicative of the sensed throttle valve opening and supplying same to an electronic control unit (hereinafter called "the ECU") 5.

Fuel injection valves 6, only one of which is shown, are inserted into the interior of the intake pipe at locations intermediate between the cylinder block of the engine 1 and the throttle valve 3' and slightly upstream of respective intake valves, not shown. The fuel injection valves 6 are connected to a fuel pump, not shown, and electrically connected to the ECU 5 to have their valve opening periods controlled by signals therefrom.

Ignition plugs 22 provided for respective cylinders of the engine 1 are connected via a driving circuit 21 to the ECU 5 which controls the ignition timing $\theta ig$ of the ignition plugs 22.

Further, an electromagnetic valve 23 for valve timing changeover control, described hereinafter, is connected to the output side of the ECU 5 which controls opening and closing of the electromagnetic valve 23.

On the other hand, an intake pipe absolute pressure ($P_{BA}$) sensor 8 is provided in communication with the interior of the intake pipe 2 at a location immediately downstream of the throttle valve 3' for supplying an electric signal indicative of the sensed absolute pressure within the intake pipe 2 to the ECU 5. An intake air temperature ($T_A$) sensor 9 is inserted into the intake pipe 2 at a location downstream of the intake pipe absolute pressure sensor 8 for supplying an electric signal indicative of the sensed intake air temperature $T_A$ to the ECU 5.

An engine coolant temperature ($T_W$) sensor 10, which may be formed of a thermistor or the like, is mounted in the cylinder block of the engine 1, for supplying an electric signal indicative of the sensed engine coolant temperature $T_W$ to the ECU 5. An engine rotational speed (Ne) sensor 11 and a cylinder-discriminating (CYL) sensor 12 are arranged in facing relation to a camshaft or a crankshaft, not shown, of the engine 1. The engine rotational speed sensor 11 generates a pulse as a TDC signal pulse at each of predetermined crank angles whenever the crankshaft rotates through 180 degrees, while the cylinder-discriminating sensor 12 generates a pulse at a predetermined crank angle of a particular cylinder of the engine, both of the pulses being supplied to the ECU 5. A knocking sensor 24 is mounted in a peripheral wall of the cylinder block of the engine 1 at a location in the vicinity of the top-dead-center of an engine cylinder, for sensing vibration of the engine and supplying an electric signal indicative of the sensed vibration to the ECU 5. The knocking sensor 24 is adapted to resonate with the frequency of knocking taking place within the cylinder. Such knocking sensors may be provided for respective cylinders to detect knocking more accurately.

A three-way catalyst 14 is arranged within an exhaust pipe 13 connected to the cylinder block of the engine 1 for purifying noxious components such as HC, CO, and NOx. An $O_2$ sensor 15 as an exhaust gas ingredient concentration sensor is mounted in the exhaust pipe 13 at a location upstream of the three-way catalyst 14, for sensing the concentration of oxygen present in exhaust gases emitted from the engine 1 and supplying an electric signal indicative of the sensed oxygen concentration to the ECU 5.

Further electrically connected to the ECU 5 are a vehicle speed sensor 16, a gear position sensor 17 for detecting the shift lever position of a transmission, and an oil pressure sensor 18 for detecting oil pressure in oil feeding passages ($88i$, $88e$ in FIG. 2), referred to hereinafter, of the engine 1. Signals from these sensors are supplied to the ECU 5.

The ECU 5 comprises an input circuit $5a$ having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU") $5b$, memory means $5c$ storing various operational programs which are executed in the CPU $5b$ and for storing results of calculations therefrom, etc., and an output circuit $5d$ which outputs driving signals to the fuel injection valves 6, the driving circuit 21, and the electromagnetic valve 23.

The CPU $5b$ operates in response to the above-mentioned signals from the sensors to determine operating conditions in which the engine 1 is operating such as an air-fuel ratio feedback control region for controlling the air-fuel ratio in response to oxygen concentration in exhaust gases and open-loop control regions, and calculates, based upon the determined operating conditions, the valve opening period or fuel injection period $T_{OUT}$ over which the fuel injection valves 6 are to be opened, by the use of the following equation in synchronism with inputting of TDC signal pulses to the ECU 5.

$$T_{OUT} = T_i \times K_{WOT} \times K_1 + K_2 \quad (1)$$

where $T_i$ represents a basic fuel amount, more specifically a basic fuel injection period of the fuel injection valves 6, which is determined based upon the engine rotational speed Ne and the intake pipe absolute pressure $P_{BA}$. As the $T_i$ map for determining the $T_i$ value, a $T_{iL}$ map for low speed valve timing and a $T_{iH}$ map for high speed valve timing are stored in the memory means 5C.

$K_{WOT}$ represents a high load enriching coefficient for increasing the amount of fuel in a predetermined high load engine operating region.

$K_1$ and $K_2$ represent other correction coefficients and correction variables, respectively, which are calculated based on various engine parameter signals to such values as to optimize operating characteristics of the engine such as fuel consumption and accelerability, depending on operating conditions of the engine.

The CPU $5b$ decides the ignition timing $\theta ig$ based on the engine rotational speed Ne and the intake pipe absolute pressure $P_{BA}$. As the $\theta ig$ map for determining the ignition timing, similarly to the $T_i$ maps, a $\theta ig_L$ map for the low speed valve timing and a $\theta ig_H$ map for the high speed valve timing are stored in the memory means 5C.

Figure 9A:
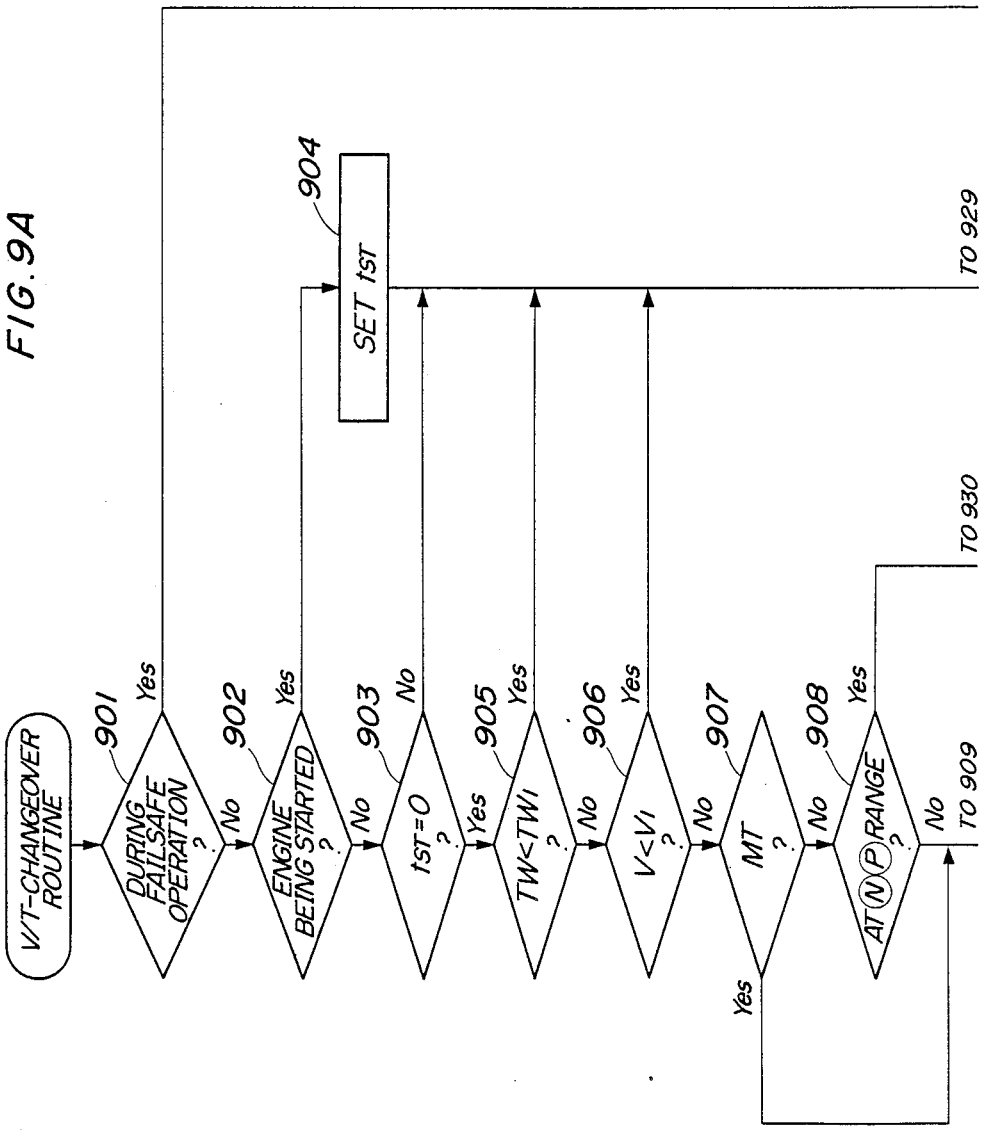
Figure 9B:
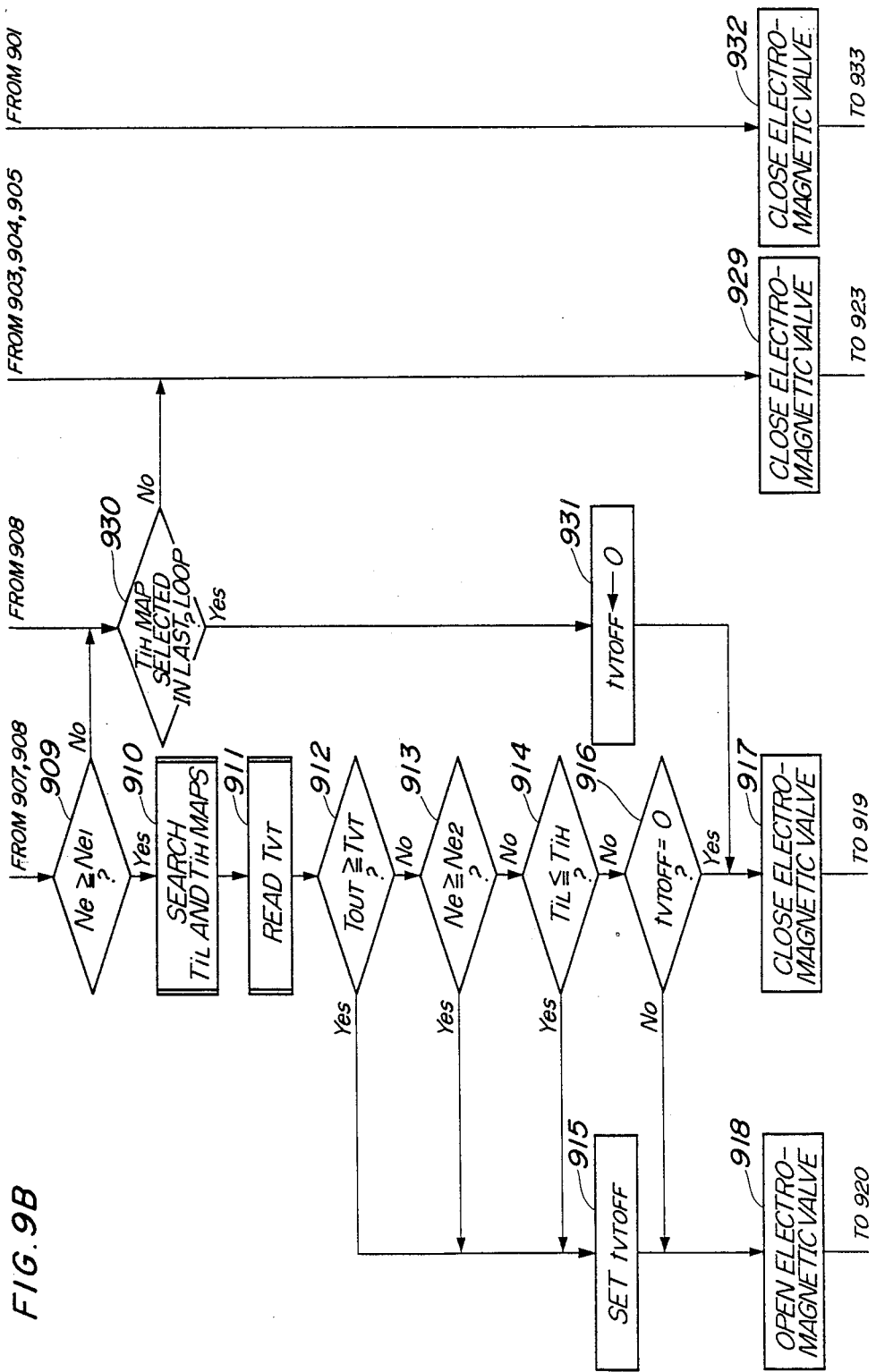

Further, the CPU $5b$ controls the opening and closing of the electromagnetic valve 23 in a manner described hereinafter with reference to FIG. 9.

The CPU $5b$ supplies the output circuit $5d$ with driving signals for driving the fuel injection valves 6, the driving circuit 21, and the electromagnetic valve 23, based upon the results of the above calculations and decisions.

Figure 2:
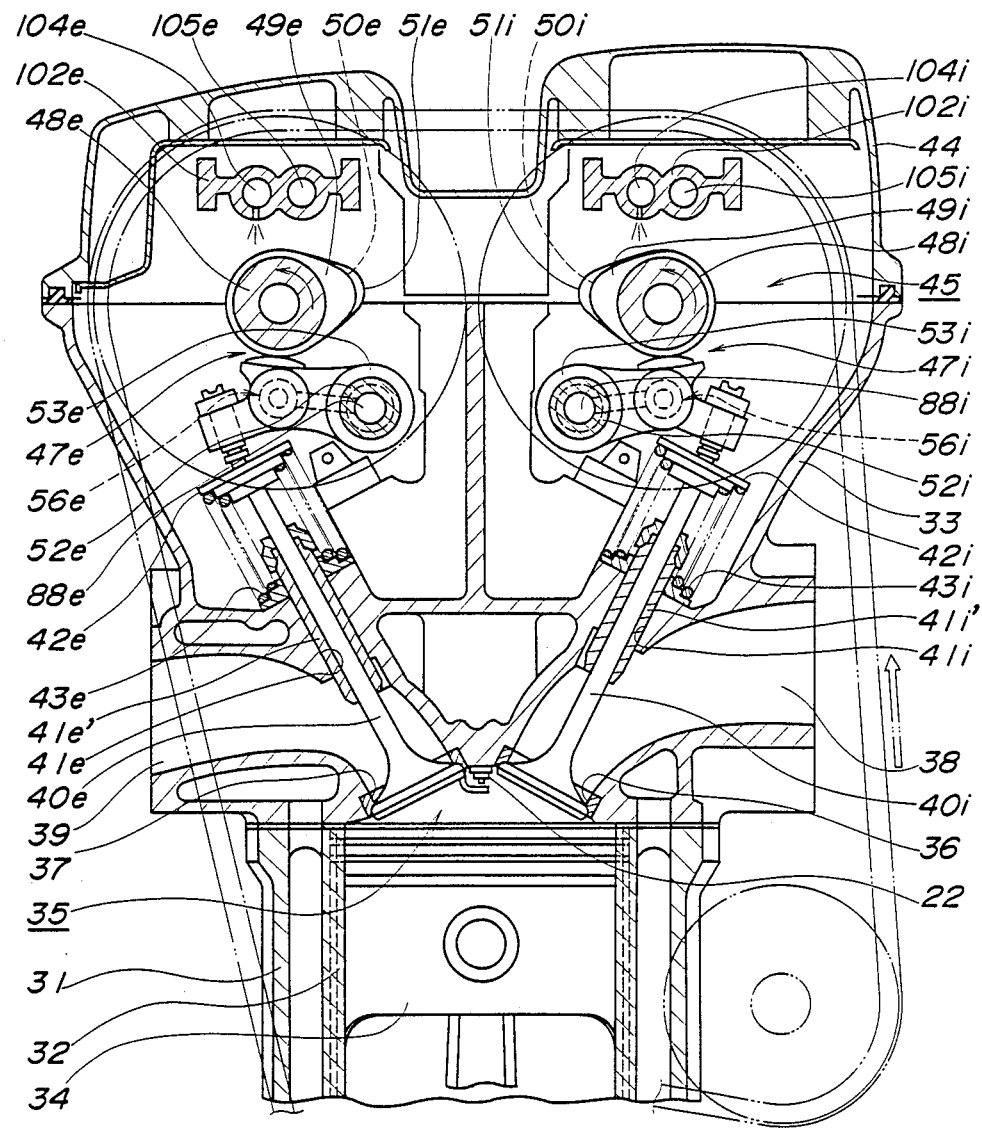
FIG. 2 is a longitudinal cross-sectional view of essential parts of the engine.

FIG. 2 shows a longitudinal cross-section of essential parts of the engine 1. Four cylinders 32, only one of which is shown, are arrangaed in a line within a cylinder block 31. Combustion chambers 35 are defined between a cylinder head 33 mounted on an upper end of the cylinder block 31 and pistons 34 slidably fitted within respective cylinders 32. The cylinder head 33 has a pair of inlet ports 36 and a pair of exhaust ports 37 formed in a portion thereof serving as a ceiling of each combustion chamber. Each inlet port 36 is connected to an inlet passage 38 which opens in one side wall of the cylinder head 33, while each exhaust port 37 is connected to an exhaust passage 39 which opens in another side wall of the cylinder head 33.

An inlet valve $40i$ is arrangead in each inlet part 36 to open and close same, while an exhaust valve $40e$ is arranged in each exhaust port 37 to open and close same. The inlet valves $40i$ and exhaust valves $40e$ are guided by respective guide sleeves $41i'$ and $41e'$ which are fitted in respective guide holes $41i$ and $41e$ formed in the cylinder head 33. Valve springs $43i$, $43e$ are interposed between respective valve seats formed at ends of the guide holes $41i$, $41e$ and respective collars $42i$, $42e$ secured on upper ends of each inlet valve $40i$ and each exhaust valve $40e$ projected from the respective guide holes $41i$, $41e$. The valve springs $43i$, $43e$ urge the respective inlet and exhaust valves $40i$, $40e$ in the upward or valve-closing direction.

The cylinder head 33 and a head cover 44 mounted on an upper end thereof define therebetween a working chamber 45 which accommodates an inlet valve-operating device $47i$ for opening and closing the inlet valve $40i$ in each cylinder 32, and an exhaust valve-operating device $47e$ for opening and closing the exhaust valve $40e$ in same. The valve-operating devices $47i$, $47e$ are basically of the same construction. Therefore, only the component parts of the inlet valve-operating device $47i$ will be described below with reference numerals having a letter i affixed thereto, while those of the exhaust valve-operating device 47e are merely shown in the drawings with corresponding reference numerals having a letter e affixed thereto.

Figure 3:
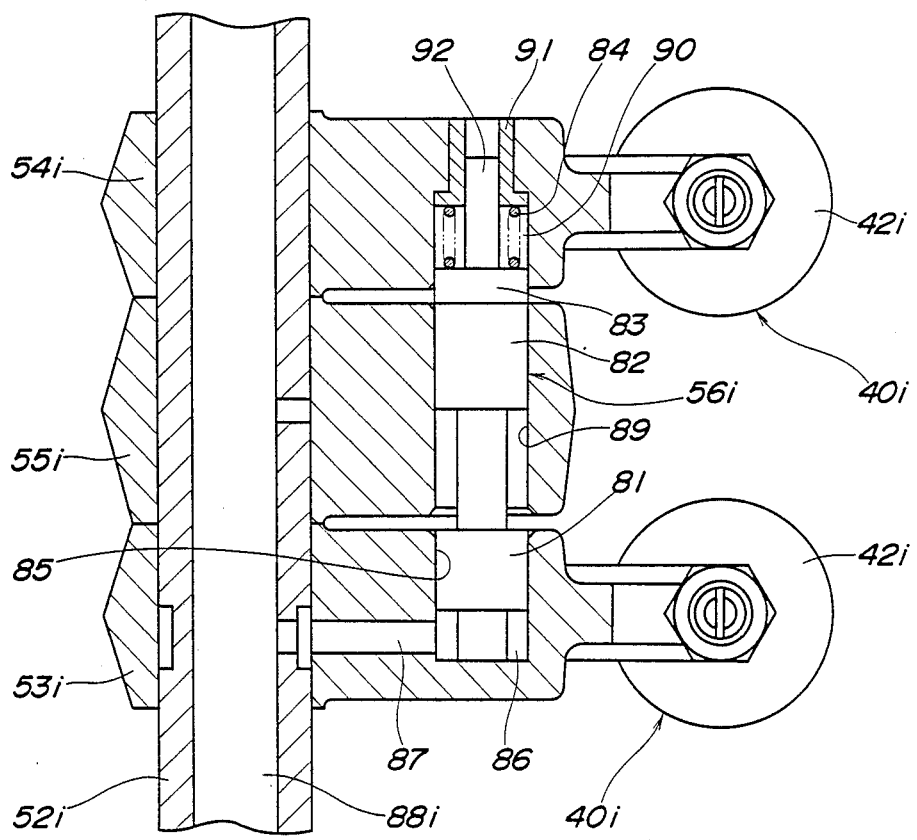
FIG. 3 is a transverse cross-sectional view of a connection-changeover mechanism.

Referring also to FIG. 3, the inlet valve-operating device 47i comprises a camshaft 48i rotatively driven by a crankshaft, now shown, at a speed ratio of ½, a high speed cam 51i and low speed cams 49i, 50i secured on the camshaft 48i, provided for each cylinder 32 (the low speed cam 50i has substantially the same configuration as the low speed cam 49i, both being arrangaed on opposite sides of the high speed cam 51i), a rocker shaft 52i extending parallel with the camshaft 48i, first and second driving rocker arms 53i and 54i, and a free rocker arm 55i pivotally mounted on the rocker shaft 52i, the three arms being provided for each cylinder 32, a connection-changeover mechanism 56i arranged in the corresponding rocker arms 53i, 54i, 55i for each cylinder.

As shown in FIG. 3, the connection-changeover mechanism 56i comprises a first changeover pin 81 capable of connecting the first driving rocker arm 53i with the free rocker arm 55i, a second changeover pin 82 capable of connecting the second driving rocker arm 54i with the free rocker arm 55i, a restriction pin 83 for restricting the movement of the first and second changeover pins 81, 82, and a spring 84 urging the pins 81, 82, 83 in the rocker arms-disconnecting direction.

The first driving rocker arm 53i is formed therein with a first guide bore 85 extending parallel with the rocker shaft 52i with one end thereof closed and the other end opening in a side face thereof facing the free rocker arm 55i. The first changeover pin 81 is slidably fitted in the first guide bore 85, defining an oil hydraulic chamber 86 between one end thereof and the closed end of the first guide bore 85. Further, a passage 87 extends from the oil hydraulic chamber 86 and opens into an oil feeding passage 88i formed in the rocker shaft 52i so that the passage 88i permanently communicates via the passage 87 with the oil hydraulic chamber 86 irrespective of rocking motion of the first driving rocker arm 53i.

The free rocker arm 55i is formed therein with a guide through hole 89 at a location corresponding to the first guide bore 85, which extends through the free rocker arm 55i and parallel with the rocker shaft 52i. The second changeover pin 82 is slidably fitted in the guide through hole 89, with one end thereof abutting on an opposed end face of the first changeover pin 81.

The second driving rocker arm 54i is formed therein with a second guide bore 90 at a location corresponding to the guide through hole 89, which extends parallel with the rocker shaft 52i with one end thereof opening toward the free rocker arm 55i. The restriction pin 83 in the form of a disc is slidably fitted in the second guide bore 90, in a fashion abutting on the other end of the second changeover pin 82. Further, the second guide bore 90 has a guide sleeve 91 fitted therein, in which is slidably fitted an axial rod 92 which coaxially and integrally projects from the restriction pin 82. The spring 84 is interposed between the guide sleeve 91 and the restriction pin 83 and urges the pins 81, 82, 83 toward the oil hydraulic chamber 86.

In the connection-changeover mechanism 56i constructed as above, when the pressure in the oil hydraulic chamber 86 is increased, the first changeover pin 81 is forced to move into the guide through hole 89 and at the same time the second changeover pin 82 is urgedly moved into the second guide bore 90 to connect the rocker arms 53i, 55i, 54i together. When the pressure in the oil hydraulic chamber 86 is decreased, the first changeover pin 81 is moved back by the urging force of the spring 84 into a position in which the end face thereof abutting on the second changeover pin 82 corresponds in location to the space between the first driving rocker arm 53i and the free rocker arm 55i, and at the same time the second changeover pin 82 is moved back into a position in which the end face thereof abutting on the restriction pin 83 corresponds in location to the space between the free rocker arm 55i and the second driving rocker arm 54i, whereby the rocker arms 53i, 55i, 54i become disconnected from each other.

Figure 4A:
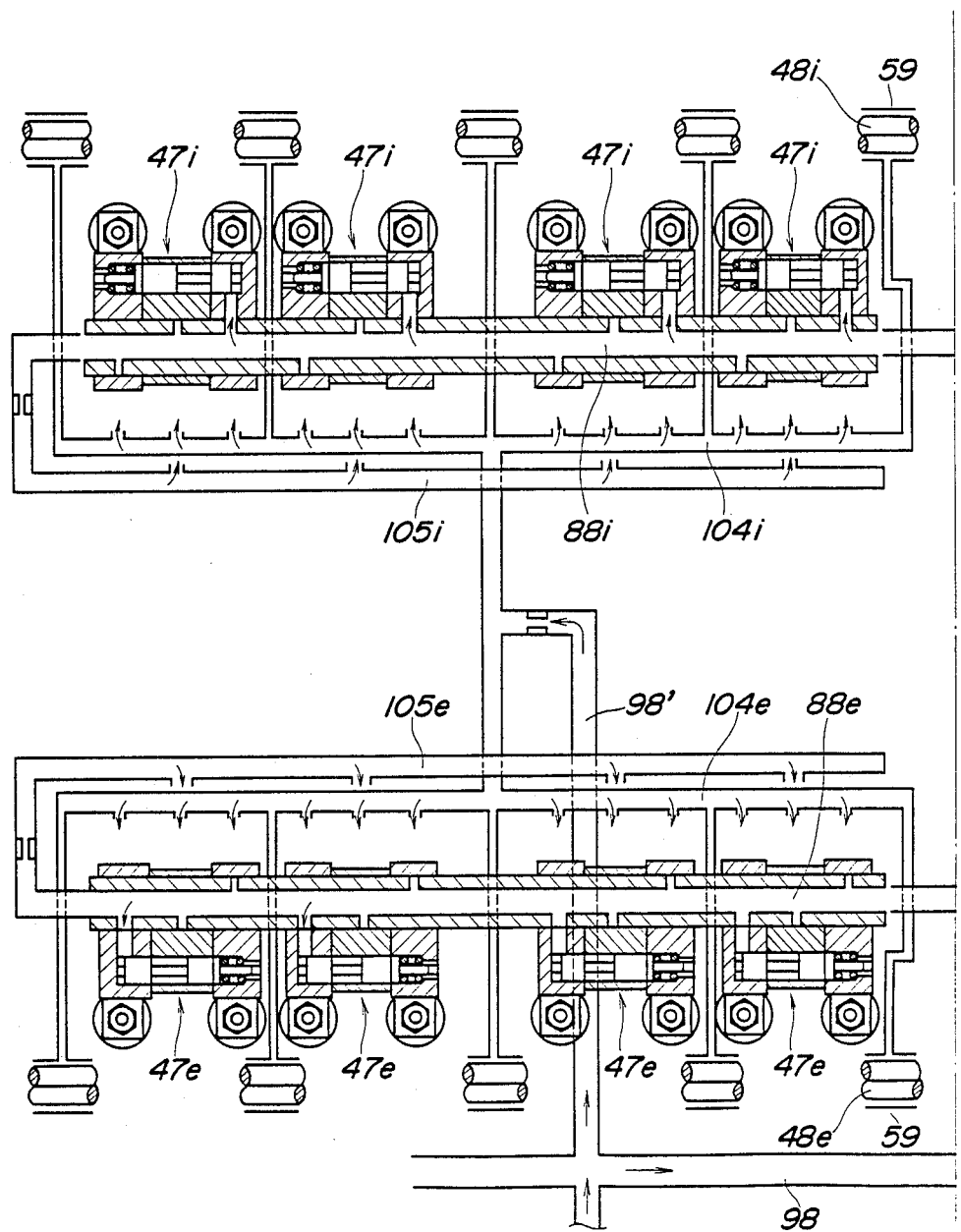

Next, the oil-feeding system for supplying oil to the valve-operating devices 47i, 47e will be described with reference to FIGS. 4, 4A and 4B. Oil galleries 98, 98' are connected to an oil pump, not shown, for pumping oil from an oil pan, not shown. From the oil galleries 98, 98', oil pressure is supplied to the connection-changeover mechanisms 56i, 56e, while lubricating oil is supplied to the lubricating parts of the valve-operating devices 47i, 47e.

Connected to the oil gallery 98 is a selector valve 99 for changing the oil pressure supplied between high and low levels. The oil feeding passages 88i, 88e in the respective rocker shafts 52i, 52e are connected via the selector valve 99 with the oil gallery 98.

Passage-forming members 102i, 102e respectively extend parallel waith the camshafts 48i, 48e and are secured to upper surfaces of cam holders 59 by means of a plurality of bolts. The passage-forming members 102i, 102e are formed therein with respective low speed lubricating oil passages 104i, 104e, and high speed lubricating oil passages 105i, 105e, all of which have opposite closed ends and form pairs of parallel passages. The low speed lubricating oil passages 104i, 104e are connected to the oil gallery 98', and the high speed lubricating oil passages 105i, 105e are connected to the oil feeding passages 88i, 88e. Further, the low speed lubricating oil passages 104i, 104e are connected to the cam holder 59.

The selector valve 99 comprises an oil inlet port 119 connected to the oil gallery 98, an oil outlet port 120 connected to the oil feeding passages 88i, 88e, and a spool valve 122 slidably fitted within a housing 121 mounted on one end face of the cylinder head 33.

The housing 121 is formed therein with a cylinder hole 124 having an upper end thereof closed with a cap 123, and within which is fitted the spool valve 122 to define an operating oil hydraulic chamber 125 between an upper end thereof and the cap 123. Further, a spring 127 is accommodated within a spring chamber 126 defined between the spool valve 122 and a lower part of the housing 121 and urges to spool valve 122 in the upward or valve-closing direction. The spool valve 122 has an annular recess 128 formed therearound for communicating between the oil inlet port 119 and the oil outlet port 120. When the spool valve is in an upper position as shown in FIG. 4, it cuts off the communication between the oil inlet port 119 and the oil outlet port 120.

An oil filter 129 is held between the oil inlet port 119 and a high speed oil pressure feeding passage 116. Further, the housing 121 has a restriction passage 131 formed therein, which provides communication between the oil inlet port 119 and the oil outlet port 120. Therefore, even when the spool valve 122 is in a closed position, the oil inlet port 119 and the oil outlet port 120 are communicated with each other through the restriction passage 131 whereby oil pressure decreased through the restriction passage 131 is supplied via the oil outlet port 120 to the oil feeding passages 88i, 88e.

The housing 121 also has a bypass port 132 formed therein, which is disposed to communicate via the annular recess 128 with the oil outlet port 120 only when the spool valve 122 is in the closed position. The bypass port 132 communicates with the interior of the cylinder head 33 at an upper location thereof.

Connected to the housing 121 is a conduit line 135 which always communicates with the oil inlet port 119. The conduit line 135 is connected via the electromagnetic valve 23 with a conduit line 137 which is in turn connected with a communication hole 138 formed in the cap 123. Therefore, when the electromagnetic valve 23 is opened, oil pressure is supplied to the operating oil hydraulic chamber 125 to thereby move the spool valve 122 in the valve-opening direction.

Further, the housing 121 has the oil pressure sensor 18 mounted thereon for detecting the oil pressure in the oil outlet port 120, i.e. the oil pressure in oil feeding passages 88i, 88eto determine whether the selector valve 99 is normally functioning or not.

The operation of the valve-operating devices 47i, 47e having the above-described construction will be described below. Since the valve-operating devices 47i, 47e operate similarly to each other, the following description refers only to the operation of the inlet valve-operating device 47.

When the ECU 5 sends out a valve-opening instruction signal to the electromagnetic valve 23, the electromagnetic valve 23 is opened to thereby cause the selector valve 99 to open, so that the oil pressure in the oil feeding passage 88i is increased. This causes the connection-changeover mechanism 56i to operate to connect the rocker arms 53i, 54i, 55i together, whereby the high speed cam 51i operates the rocker arms 53i, 54i, 55i in unison to cause each pair of inlet valves 40i to open and close at high speed valve timing in which the valve-opening period and the valve lift amount are relatively greater.

On the other hand, when the ECU 5 supplies a valve-closing instruction signal to the electromagnetic valve 23, the electromagnetic valve 23 and in turn the selector valve 99 are closed to thereby decrease the oil pressure in the oil feeding passage 88i. This causes the connection-changeover mechanism 56i to operate to disconnect the rocker arms 53i, 54i, 55i from each other, whereby the low speed cams 49i, 50i operate the corresponding rocker arms 53i, 54i to cause the pair of inlet valves 40i to open and close at low speed valve timing in which the valve-opening period and the valve life amount are relatively smaller.

Next, the valve timing-changeover control according to the invention will be described below.

Figure 5:
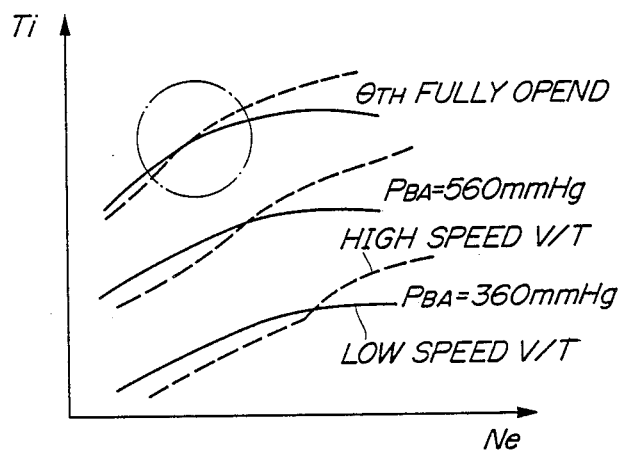
FIG. 5 is a diagram showing set basic fuel injection period characteristics for low speed valve timing and high speed valve timing.

In FIG. 5, the Ti value of the $Ti_L$ map for low speed valve timing and that of the $Ti_H$ map for high speed valve timing are respectively indicated by solid lines and dotted lines. As is clear from the figure, in the case of the low speed valve timing being selected, the rate of increase in the intake air amount becomes smaller with increase in the engine rotational speed Ne, while in the case of the high speed valve timing being selected, the charging efficiency becomes higher with increase in the engine rotational speed Ne whereby the intake air amount becomes greater than in the case of the low speed valve timing being selected. Therefore, there is a point of engine rotational speed Ne where the Ti value for low speed valve timing and the Ti value for high speed valve timing are identical to each other. In this point of Ne, in both cases of the high and low speed valve timings being selected, the intake air amount is identical, and at the same time the air-fuel ratio is also identical, so that the engine output becomes substantially identical.

Figure 6:
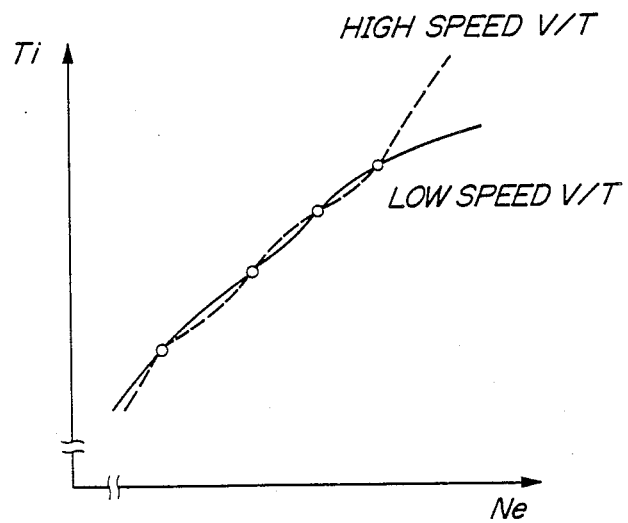
FIG. 6 is an enlarged view of a portion encircled in FIG. 5.

The charging efficiency finely varies with the engine rotational speed Ne, and particularly in the vicinity of the maximum throttle valve opening (θth), the variation becomes markedly great. FIG. 6 shows on an enlarged scale part of FIG. 5 for explaining this variation. At a plurality of points, the Ti value for low speed valve timing and that for high speed valve timing become identical to each other. As described hereinafter, when the valve timing is changed at a point where the Ti value for low speed valve timing and that for high speed valve timing are identical to each other, hunting in changeover the valve timing, i.e. frequent changeover of valve timing, is liable to occur in the region of wide throttle valve opening (WOT), which adversely affects the durability of the connection-changeover mechanisms 56i, 56e.

Figure 7:
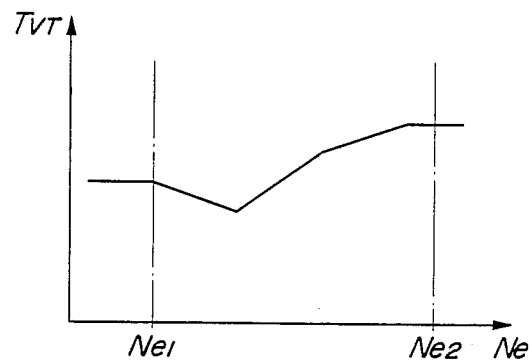
FIG. 7 is a diagram showing a $T_{VT}$ table.

In this connection, when the engine is in a high load operating region (maximum θth (WOT) region), the air-fuel ratio is enriched by the high load enriching coefficient $K_{WOT}$ increase the engine output. In such a high load operating region, the engine output can be more effectively increased if the valve timing is changed to the high speed valve timing. Therefore, when the engine is in the high load operating region (maximum θth (WOT) region), from a $T_{VT}$ table in which a high load determination value $T_{VT}$ experimetally obtained based on the fuel injection amount $T_{OUT}$ is set in relation to the engine rotational speed Ne as shown in FIG. 7, a $T_{VT}$ value is obtained in accordance with the engine rotational speed Ne, and when the fuel injection amount $T_{OUT}$ is equal to or higher than the $T_{VT}$ value, the valve timing is changed to the high speed valve timing. In this case, if it is arranged that the region defined by $T_{OUT} \geq T_{VT}$ includes the aforesaid points in the wide throttle valve opening region where the Ti value for low speed valve timing and that for high speed valve timing are identical to each other, the hunting in the valve timing can be prevented. In addition, the $T_{VT}$ table used for vehicles with automatic transmissions is different from that used for vehicles with manual transmissions.

Further, generally, in order to prevent overspeed of the engine, fuel cut is carried out when the engine rotational speed Ne exceeds a predetermined value (so-called revolution limitter value) $N_{HFC}$. Load acting on a timing belt connecting between the crankshaft and the camshaft increases with decrease in the opening period of the valve because the acceleration of opening movement of the valve increases with decrease in the valve opening period. Further, as the acceleration increases, a critical value of the engine rotation speed above which there can occur jumping of the valve decreases. Therefore, the maximum allowable engine rotational speed should be different between when the valve timing is set to the low speed valve timing in which the valve opening period is shorter and when the valve timing is set to the high speed valve timing in which the valve opening period is longer. Accordingly, in this embodiment, the revolution limitter value is set at a relatively low value $N_{HFC1}$ (e.g. 7500 rpm) for the low speed valve timing, and at a relatively high value $N_{HFC2}$ (e.g. 8100 rpm) for the hnigh speed valve timing.

Figure 8:
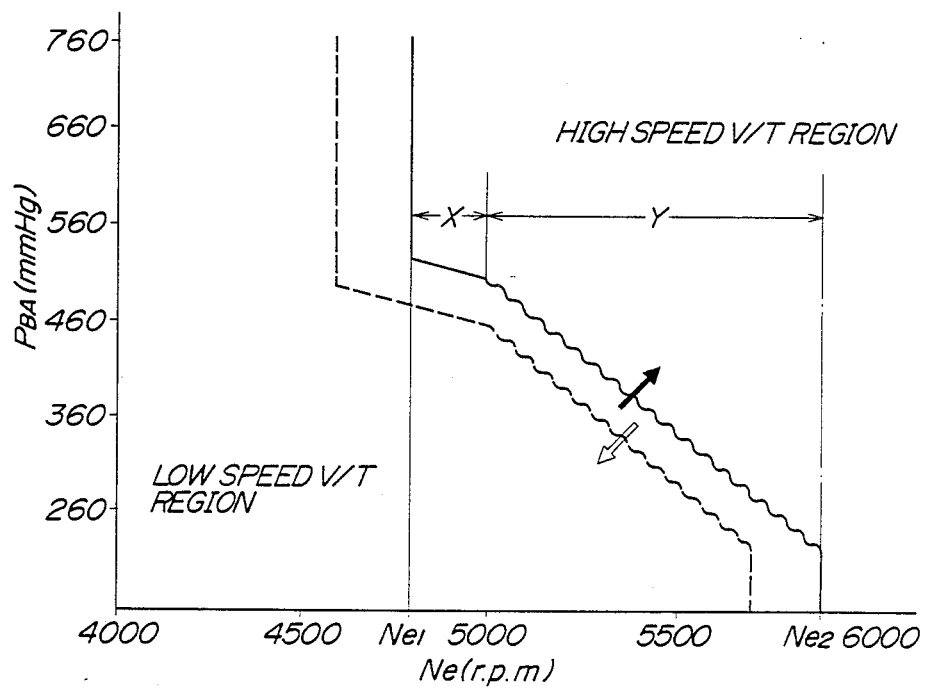
FIG. 8 is a diagram showing lower speed and higher speed valve timing regions.

Next, reference is made to FIG. 8 showing the valve timing regions. In the figure, the solid line indicates a boundary line between the low speed valve timing region and the high speed valve timing region, which is selected when the valve timing is changed from the low speed valve timing to the high speed valve timing, and the broken line indicates one which is selected when the valve timing is changed from the high speed valve timing to the low speed valve timing.

The changeover of the valve timing is carried out in a region between a value $Ne_1$ of the engine rotational speed below which the engine output obtained by the low speed valve timing always exceeds the engine output obtained by the high speed valve timing and a value $Ne_2$ of the engine rotational speed above which the engine output obtained by the high speed valve timing always exceeds the engine output obtained by the low speed valve timing. In this embodiment, hysteresis is imparted to the engine rotational speed values $Ne_1$ and $Ne_2$ between changeover of the valve timing from the low speed valve timing to the high speed valve timing and vice versa such that $Ne_1$ is set to e.g. 4800 rpm/4600 rpm and $Ne_2$ is set to e.g. 5900 rpm/5700 rpm.

In FIG. 8, X indicates a region in which the engine is in a high load operating region (WOT region) and the changeover of valve timing is carried out by comparison between $T_{OUT}$ and $T_{VT}$, and Y indicates a region in which the changeover of the valve timing is carried out by comparison between a $T_{IL}$ value for the low speed valve timing and a $T_{IH}$ value for the high speed valve timing. Incidentally, since the changeover characteristic in the region X is also under the influence of parameters other than the engine rotational speed Ne and the intake pipe absolute pressure $P_{BA}$ used for calculation of $T_{OUT}$, the changeover characteristic cannot be accurately plotted in FIG. 8 in which the engine rotational speed Ne is indicated by the abscissa and the intake pipe absolute pressure $P_{BA}$ is indicated by the ordinate. Therefore, the changeover characteristic in the region X of FIG. 8 should be taken as one for mere understanding of the concept of the invention.

Next, reference is made to FIGS. 9, 9A, 9B and 9C to explain a program for controlling the changeover of the valve timing executed by the ECU 5, i.e. a program for output control of signals supplied to the electromagnetic valve 23. This program is executed upon generation of each pulse of the TDC signal and in synchronism therewith.

At a step 901, it is determined whether or not a failsafe operation should be carried out, e.g. by determining whether or not any engine operating parameter sensor is normally functioning or whether or not abnormality has occurred in the control system other than such sensor.

Specifically, it is determined that the engine is in an operating condition in which a failsafe operation should be carried out, if, for example, there is detected an abnormality in any of the outputs from the intake pipe absolute pressure ($P_{BA}$) sensor 8, the cylinder-discriminating (CYL) sensor 12, the engine rotational speed (TDC) sensor 11, the engine coolant temperature sensor 10, and the vehicle speed sensor 16, an abnormality in outputting of a control signal for ignition timing or in outputting of driving signals for the fuel injection valves, an abnormality in the amount of electric current supplied to the electromagnetic valve 23 for the valve timing control, or an abnormality that a normal change has not been detected in oil pressure at the oil outlet port 120 responsive to opening and closing of the electromagnetic valve 23 for the valve timing control by a oil pressure switch of the oil pressure sensor 18, over a predetermined time period. In addition, when one of the CYL sensor and the TDC sensor is abnormal, the other is used in place thereof.

If the answer to the question of the step 901 is Yes, i.e., if the failsafe operation should be carried out, the program proceeds to a step 932, hereinafter referred to, and if the answer is No, the program proceeds to a step 902.

At the step 902, it is determined whether or not the engine is being started, from the engine rotational speed Ne, etc., and at a step 903, it is determined whether or not a delay timer has counted up a predetermined time period (e.g. 5 seconds) $t_{ST}$. If the answer to the question of the step 902 is Yes, the program proceeds to a step 904, where the timer is set to the predetermined time period $t_{ST}$ for starting to count same after the engine starting has been completed. At a step 905, it is determined whether or not the engine coolant temperature $T_W$ is lower than a predetermined value $T_{W1}$ (e.g. 60° C.), i.e. whether or not the engine is in warming-up operation. At a step 906, it is determined whether or not the vehicle speed V is lower than a very low predetermined value $V_1$ (with hysteresis, e.g. 8 km/5 km). At a step 907, it is determined whether or not the vehicle on which the engine is installed is provided with a manual transmission (MT). At a step 908, it is determined, when the vehicle is an automatic transmission type (AT), whether or not the shift lever is positioned in the parking range (P) or the neutral range (N). At a step 909, it is determined whether or not the engine rotational speed Ne is not lower than the predetermined lower limit value $Ne_1$ (e.g. 4800 rmp/4600 rpm). If as a result of the above determinations, the failsafe operation is being carried out (the answer to the question of the step 901 is Yes), or if the engine is being started (the answer to the question of the step 902 is Yes), or if the predetermined time period $t_{ST}$ has not elapsed after the enginer has completed starting (the answer to the question of the step 903 is No), or if the engine is still in warming up operation (the answer to the question of the step 905 is Yes), or if the vehicle is standing or moving slowing (the answer to the question of the step 906 is Yes), or if the shift lever is in the P or N range (the answer to the question of the step 908 is Yes), or if $Ne < Ne_1$ (the answer to the question of the step 909 is No), the electromagnetic valve 23 is closed to maintain the low speed valve timing.

If it is determined at the step 909 that $Ne \geq Ne_1$ is satisfied, at a step 910, from the $Ti_L$ map and the $Ti_H$ map, there are obtained a Ti value (hereinafter referred to as "$Ti_L$") of the $Ti_L$ map and a Ti value (hereinafter referred to as "$Ti_H$") of the $Ti_H$ map each corresponding to the engine rotational speed Ne and the intake air absolute pressure $P_{BA}$. Then, at a step 911, from the $T_{VT}$ table set depending on whether the vehicle is AT or MT is obtained a high load determination value $T_{Vt}$ corresponding to the engine rotational speed Ne. At a step 912, the $T_{Vt}$ is compared with the $T_{OUT}$ in the immediately preceding loop to determine whether $T_{OUT} \geq T_{VT}$ is satisfied, i.e. whether the engine is in the high load operating condition in which the air-fuel ratio should be enriched. If the step 912 is No, i.e. if $T_{OUT} < T_{VT}$ is satisfied, the program proceeds to a step 913, where it is determined whether or not the engine rotational speed Ne is not lower than the predetermined upper limit value $Ne_2$. If the answer to the question of the step 913 is No, i.e. if $Ne<Ne_2$ is satisfied, the program proceeds to a step 914, where the $Ti_L$ and the $Ti_H$ obtained at the step 910 are compared with each other. If $Ti_L>Ti_H$ is satisfied, it is determined at a step 916 whether or not a timer value $t_{VTOFF}$ of a delay timer set at a step 915, referred to hereinafter, has been counted up. If the answer to the question of the step 916 is Yes, an instruction signal for closing the electromagnetic valve 23, i.e. an instruction for changing the value timing to the low speed valve timing, is generated at a step 917. On the other hand, if any of $T_{OUT} \geq T_{VT}$, $Ne \geq Ne_2$, and $Ti_L \leq Ti_H$ is satisfied, the delay timer for closing the electromagnetic valve is set to the predetermined value $t_{VTOFF}$ (e.g. 3 seconds) and started at the step 915. Then at a step 918, an instruction signal for opening the electromagnetic valve 23, i.e. an instruction for changing the valve timing to the high speed valve timing is generated.

If the valve-closing signal is generated at the step 917, it is determined at a step 919 whether or not the oil pressure switch within the oil pressure sensor 18 has been turned on, i.e. if the oil pressure in the oil feeding passages 88$i$, 88$e$ has become low. If the answer to the question of the step 919 is Yes, i.e. if the oil pressure switch has been turned on, it is determined at a step 921 whether or not a changeover delay timer has counted up a predetermined time period $t_{LVT}$ for the low speed valve timing. If the answer to the question of the step 921 is Yes, i.e. if $t_{LVT}=0$, another changeover delay timer for the high speed valve timing is set to a predetermined time period $t_{HVT}$ (e.g. 0.1 second) and started at a step 923. Then at a step 925, the $Ti_L$ map and an ignition timing map ($\theta ig_L$ map) for the low speed valve timing are selected as the Ti map and the ignition timing map to be used in a routine for fuel injection control. At the following step 927, the revolution limitter value $N_{HFC}$ is set to a predetermined value $N_{HFC1}$ for the low speed valve timing.

On the other hand, if the valve-opening signal is generated at the step 918, it is determined at a step 920 whether or not the oil pressure switch within the oil pressure sensor 18 has been turned off, i.e. if the oil pressure in the oil feeding passages 88$i$, 88$e$ has become high. If the answer to the question of the step 920 is Yes, i.e. if the oil pressure switch has been turned off, it is determined at a step 922 whether or not the changeover delay timer for the high speed valve timing has counted up the value $t_{HVT}$. If the answer to the question of the step 922 is Yes, i.e. if $t_{HVT}=0$, the the changeover delay timer for the low speed valve timing is set to a predetermined time period $t_{LVT}$ (e.g. 0.2 seconds) at a step 924, and then at a step 926, the $Ti_H$ map and an ignition timing map ($\theta ig_H$ map) for the high speed valve timing are selected as the Ti map and the ignition timing map to be used in the routine for fuel injection control. At the following step 928, the revolution limitter value $n_{HFC}$ is set to a predetermined value $N_{HFC2}$ for the high speed valve timing, which is higher than $N_{HFC1}$.

The predetermined delay time periods $t_{HVT}$ and $t_{LVT}$ are set at such values as correspond to the respective time lags, i.e. periods of time to be elapsed from opening and closing of the electromagnetic valve 23, through switching of the selector valve 99, and changing of the oil pressure in the oil feeding passages 88$i$, 88$e$, until completion of changeover operations by the connection-changeover mechanisms 56$i$, 56$e$ of all the cylinders. When the electromagnetic switch 23 is closed, the program proceeds in the order of 919-922-924-926-928 until the oil pressure switch within the oil pressure sensor 18 is turned on. After the oil pressure switch has been turned on, the program proceeds in the order of 919-921-926-928 until the connection-changeover mechanisms 56$i$, 56$e$ of all the cylinders have been changed over to the low speed valve timing position. Further, if the selector valve 99 is not closed due to failure of the electromagnetic valve 23 or the selector valve 99 etc. so that the oil pressure switch within the oil pressure sensor 18 remains open or off, the program also proceeds in the above-mentioned order of 919-922-924-926-928. Thus, until the connection-changeover mechanisms 56$i$, 56$e$ of all the cylinders have been changed to the low speed valve timing position, the fuel injection is controlled in a manner suitable for the high speed valve timing. Also, when the electromagnetic switch 23 is opened, the fuel injection is controlled in a manner suitable for the low speed valve timing until the connection-changeover mechanisms 56$i$, 56$e$ of all the cylinders have been changed to the high speed valve timing position.

In the meanwhile, if the engine is being started (the answer to the question of the step 902 is Yes), or if the time period $t_{ST}$ has not elapsed after completion of the engine starting (the answer to the question of the step 903 is No), or if the engine has not yet been warmed up (the answer to the question of the step 905 is Yes), or if the vehicle is standing or moving slowly (the answer to the question of the step 906 is Yes), the program proceeds to the step 929, where the instruction signal for closing the electromagnetic valve 23 is generated, followed by the program proceeding in the order of 923-925-927. If it is determined at the step 908 that the shift lever position is in the N pr P range, the program proceeds to a step 930, where it is determined whether or not the $Ti_H$ map has been selected in the immediately preceding loop. Also, if it is determined at the step 909 that $Ne<Ne_1$ is satisfied, the program proceeds to the step 930. If the answer to the question of the step 930 is Yes, i.e. if the $Ti_H$ map has been selected in the immediately preceding loop, the time period $t_{VTOFF}$ of the delay timer over which the electromagnetic valve is to be opened is set to 0 at a step 931, and then the program proceeds to a step 917. If the answer to the question of the step 930 is No, i.e. if the $Ti_H$ map has not been used in the immediately preceding loop, in other words, if the connection-changeover mechanisms 56$i$, 56$e$ of all the cylinders have not been changed over to the high speed valve timing position, the program proceeds, as described above, in the order of 929-923-925-927, whereby the fuel injection is controlled in a manner suitable for the low speed valve timing irrespective of the state of the oil pressure switch within the oil pressure sensor 18. This is a countermeasure for the case in which the oil pressure switch within the oil pressure sensor 18 continues to be off due to disconnection in the wiring etc.

The aforesaid revolution limitter Ne value $N_{HFC1}$ is set at a value higher than $Ne_2$, and normally the valve timing is switched to the high speed valve timing and accordingly the revolution limitter $N_{HFC}$ is set to the higher vlaue $N_{HFC2}$ before the engine rotational speed Ne rises to $N_{HFC1}$, so that fuel cut is not carried out even at $N_{HFC1}$. On the other hand, when the engine is in an operating condition in which the program proceeds from any of the steps 902-906, and 908 to the step 929, the fuel cut can be carried out at $N_{HFC1}$, since the low speed valve timing is maintained even after the engine rotational speed Ne exceeds $Ne_2$ due to racing of the engine etc. Further, even after the valve timing is switched from the low speed valve timing to the high speed valve timing, fuel cut is carried out at $N_{HFC1}$ before $t_{HVT}$ becomes 0, i.e. before the connection-changeover mechanisms 56i56e are actually changed over to the high speed valve timing position.

Figure 10:
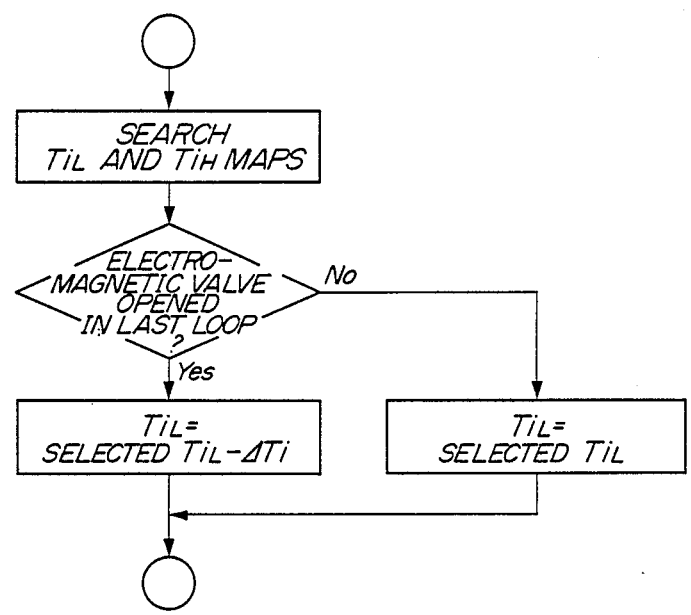
FIG. 10 is a flowchart of a subroutine for obtaining basic fuel injection period values $Ti_L$ and $Ti_H$ from respective $Ti_L$ and $Ti_H$ maps.

FIG. 10 shows the subroutine used at the step 910 for obtaining $Ti_L$ and $Ti_H$ from the respective $Ti_L$ and $Ti_H$ maps. It is determined whether or not the instruction signal for opening the electromagnetic switch 23 has been generated in the immediately preceding loop. If the instruction signal has not been generated, the $Ti_L$ to be used at the step 914 is set to a value $Ti_L$ obtained from the $Ti_L$ map, whereas if the instruction signal has been generated, the $Ti_L$ to be used at the step 914 is set to a value obtained by subtracting a predetermined hysteresis amount of $\Delta Ti$ from a value $Ti_L$ obtained from the $Ti_L$ map. Thus, hysteresis is imparted to the changeover characteristic in the region Y in FIG. 8.

Figure 11:
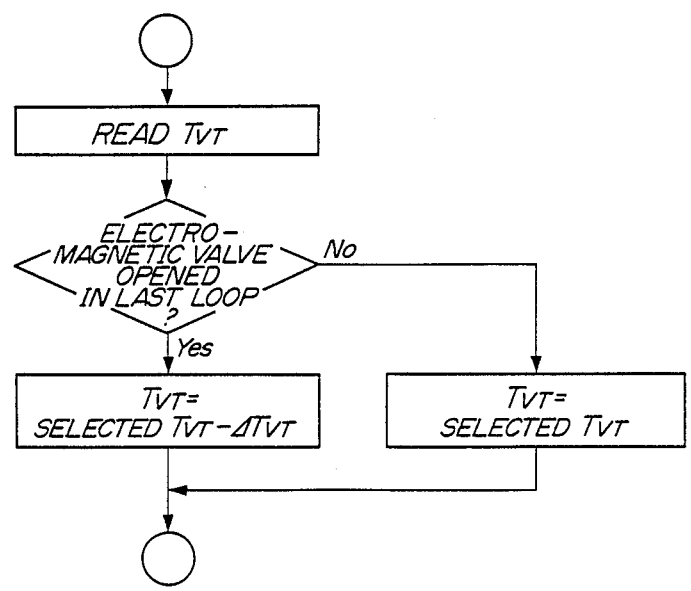
FIG. 11 is a flowchart of a subroutine for calculating a value $T_{VT}$.

FIG. 11 shows the subroutine used at the step 911 for obtaining the high load determination value $T_{VT}$ from the $T_{VT}$ table. It is determined whether or not the instruction signal for opening the electromagnetic valve 23 has been generated in the immediately preceding loop. If the signal has not been generated, the $T_{VT}$ to be used at the step 912 is set to a value $T_{VT}$ obtained from the $T_{VT}$ table, whereas if the signal has been generated, the $T_{VT}$ to be used at the step 912 is set to a value obtained by subtracting a predetermined hysteresis amount $\Delta T_{VT}$ from a value $T_{VT}$ obtained from the $T_{VT}$ table. Thus, hysteresis is imparted to the changeover characteristic in the region X in FIG. 8.

Referring again to FIG. 9c, if the answer to the question of the step 901 is Yes, i.e. if the failsafe operation is being carried out, the instruction signal for closing the electromagnetic valve 23 is generated at the step 932, and then at a step 933 it is determined whether or not the engine rotational speed Ne is higher than a predetermined value $Ne_{FS}$ for fail-safe (e.g. 3,000 rpm). If the answer to the step 933 is Yes, i.e. if $Ne > Ne_{FS}$, the $Ti_H$ map and the $\theta ig_H$ map for the high speed valve timing are selected at a step 934, followed by the program proceeding to the step 927, whereas if $Ne \leq Ne_{FS}$, the $Ti_L$ map and the $\theta ig_L$ map for the low speed valve timing are selected at a step 935, followed by the program proceeding to the step 927.

As described above, at the steps 933-935 one of the $Ti_H$ and $Ti_L$ maps is selected depending on the engine rotational speed Ne during the fail-safe operation. Therefore, even when the inlet and exhaust valves 40i, 40e are actually operated at the high speed valve timing due to failure of any of the selector valve 99, the connection-changeover mechanisms 56i, 56e, etc. in spite of the fact that the instruction signal for closing the electromagnetic valve 23 is generated during the failsafe operation, it is possible to prevent overleaning of the air-fuel ratio and hence an excessive rise in the buring temperature of the mixture or the catalyst temperature of exhaust gas purifying means, and accordingly also prevent melting of ignition plugs due to preignition of the mixture, knocking at a high engine rotational speed, and shortened life of the catalyst.

Figure 12:
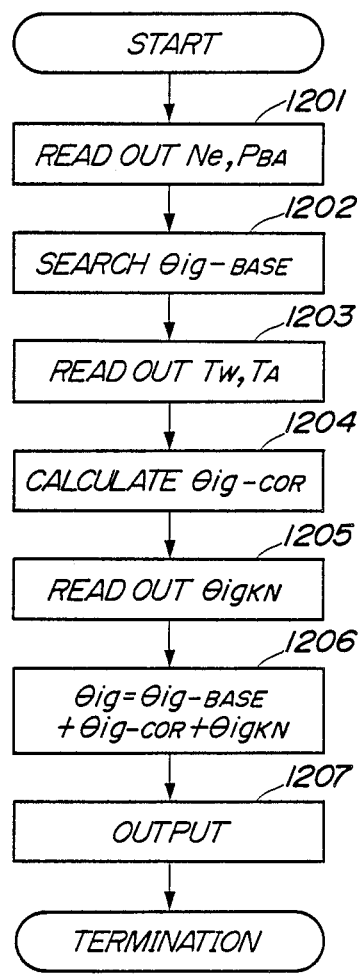
FIG. 12 is a flowchart of a program for controlling ignition timing which is executed in the knocking control system of the invention.

The manner of ignition timing control which is carried out by the knocking control system of the invention will now be explained with reference to FIg. 12.

Figure 9C:
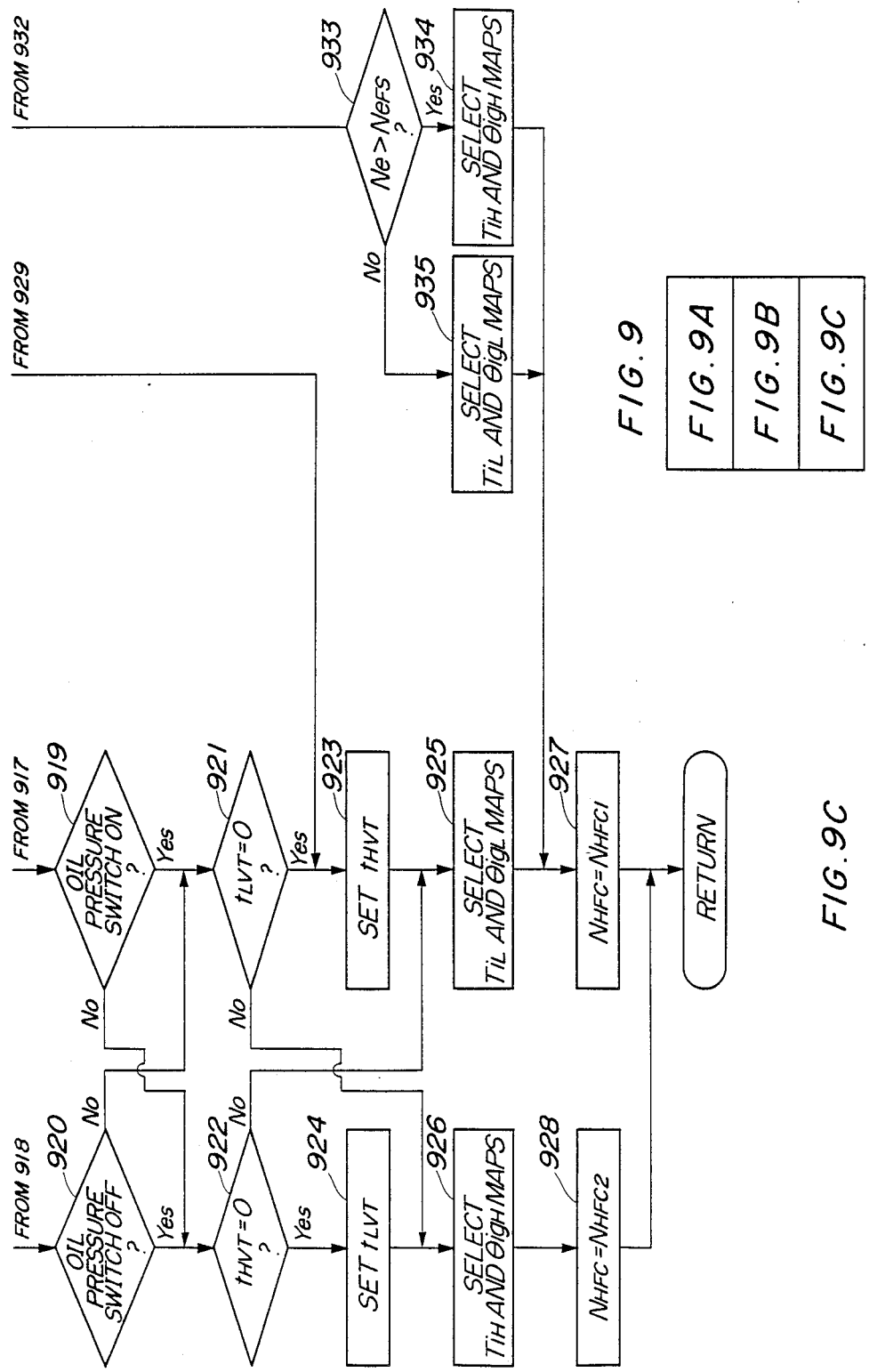

At a step 1201, the detected and stored engine rotational speed Ne and intake pipe absolute pressure $P_{BA}$ are read out, and at a step 1202 a basic ignition timing advancing amount $\theta ig_{-BASE}$ is retrieved from the $\theta ig_L$ or $\theta ig_H$ map selected at the step 925, 926, 934, or 935 FIG. 9c, in response to the engine rotational speed Ne and the intake pipe absolute pressure $P_{BA}$ read out at the step 1201. Then, the engine coolant temperature $T_W$ and the intake air temperature $T_A$ are read out at a step 1203, and at a step 1204 a correction variable $\theta ig_{-COR}$ for correcting the basic ignition timing advancing amount $\theta ig_{-BASE}$ is calculated based on the engine coolant temperature $T_W$ and the intake air temperature $T_A$ read our at the step 1203. At a step 1205, a correction variable $\theta ig_{KN}$ for preventing knocking is read out, which is determined depending on the valve timing and the result of a determination as to occurrence of knocking, hereinafter referred to, and then stored. A final ignition timing advancing amount $\theta ig$ (namely a crank angle before the top-dead-center of each cylinder at the start of compression stroke) is calculated at a step 1206 by summing up the values $\theta ig_{-BASE}$, $\theta ig_{-COR}$, and $\theta ig_{KN}$ obtained at the steps 1202, 1204, and 1205, and at a step 1207 and ignition signal based on the calculated value $\theta ig$ is supplied to the driving circuit 21 to effect ignition by the ignition plug 22.

The determination as to whether knocking has occurred, which is used for determining the correction variable $\theta ig_{KN}$ read out at the step 1205, is carried out by the use of the knocking sensor 24 and means 1301-1305 shown in (b) of FIG. 13. Specifically, an output from the knocking sensor 24 which is indicative of engine vibration is applied to gate means 1301, where the sensor output is subjected to detection by a knocking gate and a noise gate of the gate means 1301, as shown in (a) of FIG. 13, at both the low speed valve timing (hereinafter referred to as "Lo V/T") and the high speed valve timing (hereinafter referred to as "Hi V/T"). Vibration detected by the noise gate is levelled through a low-pass filter having a predetermined time constant, of noise level-calculation means 1302, to obtain mean noise levels $NL_L, NL_H$ at Lo V/T and Hi V/T, respectively. The mean noise levels $NL_L$, $NL_H$ are multiplied by mutiplier terms $G_L$, $G_H$ and increased by addend terms $OS_L$, $OS_H$ by the following equations (2) and (3) at knocking discrimination calculating means 1303, to obtain respective knocking discrimination levels aLo, aHi at Lo V/T and Hi V/T.

$$aLo = NL_L \times G_L + OS_L \quad (2)$$

$$aHi = NL_H \times G_H + OS_H \ldots \quad (3)$$

where the multiplier terms $G_L$, $G_H$ and addend terms $OS_L$, $OS_H$ are set at Lo V/T and Hi V/T, respectively, and obtained from graphs shown in FIGS. 17 A and B, respectively. The multiplier terms and addend terms are both set to larger values as the engine rotational speed Ne or the engine load increases. Further, the multiplier term $G_H$ and addend term $OS_H$ at Hi V/T are set to larger values than the multiplier term $G_L$ and added term $OS_L$ at Lo V/T. Also, the increasing rates of the multiplier term $G_L$ and addend term $OS_L$ at Lo V/T become reduced when the engine rotational speed Ne or engine load exceeds a chageover point CH, e.g. 4800 rpm. By thus setting the multiplier terms $G_L$, $G_H$ and addend terms $OS_L$, $OS_H$, the knocking discrimination levels aLo, aHi at Lo V/T and Hi V/T are substantially equal to each other and at the same time set in the vicinity of a lower limit value of a knocking level region, in spite of the fact that the noise level $NL_L$ at Lo V/T is different from the noise level $NL_H$ at Hi V/T, as shown in FIG. 18.

In practice, the knocking discrimination level calculating means is composed of amplifiers adapted such that the multiplier terms $G_L$, $G_H$, and the addend terms $OS_L$, $OS_H$ are determined by the gains and offset of the amplifiers, respectively, in dependence on the engine rotational speed Ne or engine load, as well as on the selected valve timing.

Then, the vibration levels detected by the knocking gate at both Lo V/T and Hi V/T are compared with the respective knocking discrimination levels aLo and aHi by means of knocking discriminating means 1304. If the former is higher than the latter, the knocking discriminating means 1304 judges that knocking has occurred, and then supplies an electric singal indicative of occurrence of knocking to knocking control means 1305.

The manner of knocking control will now be descibed with reference to FIG. 14.

At a step 1401, it is determined whether or not the actual valve timing is Lo V/T. If at the step 925 or 935 in FIG. 9c the Lo V/t map has been selected, the valve timing is judged to be Lo V/T, whereas if at the step 926 or 934 the Hi V/T map has been selected, the valve timing is judged to be Hi V/T.

If the answer at the step 1401 is Yes, that is, if Lo V/T is being applied, various control data for Lo V/T are selected at a step 1402, whereas if the answer is No, that is, if Hi V/T is being applied, various control data for Hi V/T are selected at a step 1403.

The various control data include: the multiplier terms $G_L$, $G_H$ and the addend terms $OS_L$, $OS_H$ to be used at a step 1404, hereinafter referred to, for calculation of knocking discrimination levels; discrimination parameters to be used in the knocking discriminating means 1304 such as crank angles at which the knocking gate and noise gate are operated, the time constant of the low-pass filter for levelling noise levels, and a reference discrimination level used for detecting abnormality in the knocking sensor 24; and control parameters to be used in the knocking control means 1305 such as a predetermined retarding limit value $\theta ig_{KNRD}$ in FIG. 15, a predetermined advancing limit value $\theta ig_{KNAV}$ in FIG. 16, the frequency of occurrence of knocking used for determining the octane number of fuel (the octane number of fuel used is determined based on the knocking frequency, and the retarding amount of the ignition timing is set depending on the octane number), a predetermined retarding correction amount $\Delta\theta_{RD}$ in FIG. 15, and a predetermined advancing correction amount $\Delta\theta_{AV}$ in FIG. 16.

At the step 1404, the knocking discrimination levels aLo and aHi are calculated by means of the knocking discrimination level-calculating means 1303 (FIG. 13) on the basis of the multiplier terms $G_L$, $G_H$ and addend terms $OS_L$, $SO_H$ for Lo V/T and Hi V/T, respectively, from the various data selected at the steps 1402, 1403. At a step 1405, it is determined whether or not the output of the knocking sensor 24 detected by the knocking gate is higher than corresponding one of the levels aLo and aHi calculated at the step 1404. If the answer is Yes, which indicates that there exists knocking, the program proceeds to a step 1406 to calculate an ignition timing retarding value or ignition timing correction variable $\theta ig_{KN}$ in accordance with a subroutine of FIG. 15, whereas if the answer is No, which indicates that there is no knocking, the program proceeds to a step 1407 to calculate an ignition timing advancing value ($\theta ig_{KN}$) in accordance with a subroutine of FIG. 16.

When it is determined that there exists knocking, the ignition timing correction variable $\theta ig_{KN}$ to be applied when knocking has taken place is calculated in accordance with the subroutine of FIG. 15. In respective first loops of the programs in FIGS. 15 and 16, the variable $\theta ig_{KN}$ is set to e.g. a value of 0 as an initial value.

At a step 1501, a count value CNO counted by a counter over which no knocking has taken place is set to a value of 0. Then at a step 1502, a value of the correction variable $\theta ig_{KN}$ is calculated by subtracting the predetermined correction amount $\Delta\theta_{RD}$ for retarding the ignition timing from a value of the correction variable $\theta ig_{KN}$ obtained in the last loop, followed by the program proceeding to a step 1503 where it is determined whether or not the value $\theta ig_{KN}$ obtained at the step 1502 is larger than the predetermined retarding limit value $\theta ig_{KNRD}$. The predetermined retarding limit value $\theta ig_{KRND}$ is determined depending on the engine rotational speed Ne and the engine load. If the answer at the step 1503 is Yes, that is, if $\theta ig_{KN} > \theta ig_{KNRD}$, the correction variable $\theta ig_{KN}$ is set to the predetermined retarding limit value $\theta ig_{KNRD}$ at a step 1504, whereas if the answer is No, the correction variable $\theta ig_{KN}$ in set to the value $\theta ig_{KN}$ calculated at the step 1502.

On the other hand, when it is determined that there is no knocking, the ignition timing correction variable $\theta ig_{KN}$ is calculated in accordance with the subroutine of FIG. 16, in order to return or advance the ignition timing which has been retarded in accordance with the subroutine in FIG. 15.

At a step 1601, a predetermined count value CAV to be counted is retrieved from a map, not shown, depending on the engine rotational speed Ne and engine load. The predetermined count value CAV corresponds to a predetermined number of TDC signal pulses over which no knocking has taken place. At a step 1602, the count value CNO of the counter is increased by a value of 1, and then it is determined at a step 1603 wheter or not the value obtained by adding the value of 1 to the count value CNO is larger than the predetermined count value CAV retrieved at the step 1601. If the answer at the step 1603 is Yes, that is, if the count value CNO has reached the predetermined count value CAV, the count value CNO is set to the value of 0 at a step 1604, followed by the program proceeding to a step 1605 to calculate the correction variable $\theta ig_{KN}$ by adding the predetermined correction amount $\Delta\theta_{AV}$ for advancing the ignition timing to the value of the correction variable $\theta ig_{KN}$ obtained in the last loop. If the answer at the step 1603 is No, that is, if the count value CNO has not reached the predetermined count value CAV, the program skips over the steps 1604 and 1605 to a step 1606.

At the step 1606, it is determined whether or not the value of $\theta ig_{KN}$ obtained at the step 1605, or, if the answer at the step 1603 is No, the value of $\theta ig_{KN}$ obtained in the last loop is larger than the predetermined advancing limit value $\theta ig_{KNAV}$. The predetermine advancing limit value $\theta ig_{KNAV}$ is determined depending on the engine rotational speed Ne and engine load. If the answer at the step 1606 is Yes, that is, if $\theta ig_{KN} > \theta ig_{KNAV}$, the correction variable $\theta ig_{KN}$ is set to the value $\theta ig_{KNAV}$, whereas if the answer is No, the correction variable $\theta ig_{KN}$ is set to the value $\theta ig_{KN}$.

The control parameters such as the correction amount $\Delta\theta_{RD}$ for retarding the ignition timing, the correction amount $\Delta\theta_{AV}$ for advancing the ignition timing, the predetermined retarding limit value $\theta ig_{KNRD}$, the predetermined advancing limit value $\theta ig_{KNAV}$ and the predetemined count value CAV are set as follows, depending on the valve timing:

|  | Hi V/T | Lo V/T |
|---|---|---|
| $\Delta\theta_{RD}$ | Large | Small |
| $\Delta\theta_{AV}$ | Large | Small |
| $\theta ig_{KNRD}$ | Large | Small |
| $\theta ig_{KNAV}$ | Large | Small |
| CAV | Large | Small |

That is, the charging efficiency at Hi V/T is higher than that at Lo V/T so that the compression ratio at Hi V/T is actually larger than that at Lo V/T, whereby knocking is more liable to take place at Hi V/T. In order to prevent knocking at Hi V/T, the control parameters are set to larger values at Hi V/T than at Lo V/T, as shown in the above table.

As decribed above, according to the invention decribed above, the discrimination parameters for the knocking discrimiation means and/or the control parameters for the knocking control means are selected to values appropriate to the selected valve timing to thereby effect proper knocking control. Further, according to the invention, the determination as to whether the valve timing is Lo V/T or Hi V/T is carried out not by detecting the opening and closing of the electromagnetic valve 23, but by detecting which of the Lo V/T map and Hi V/T map has been selected through the steps 925, 926. and 935 shown in FIG. 9c. Therefore, even if there occurs a failure such that the actual valve timing does not properly correspond to opening and closing of the electromagnetic valve 23, the invention can effect accurate knocking control since the valve timing is determined by execution of the above steps 925, 926, 934, and 935, whereby can be avoided degraded driveability and hence degraded marketability of the engine, an increase in the fuel consumption, and even damage to the engine in the worst case, etc. due to occurrence of knocking.

Although in the embodiment of the invention decribed above, the ignition timing is controlled in order to prevent knocking at the time of changeover of the valve timing, this is not limitative to the invention, but fuel supply control to enrich the air-fuel ratio or supercharging pressure control to reduce the supercharging pressure may be employed instead of the ignition timing control, in order to prevent knocking.

Further, although in the embodiment, the valve timing is changed between Lo V/T and Hi V/T, the valve timing may be varied in a continuous manner, whereby the knocking discrimination parameters or knocking control parameters are varied in a contiuous manner in accordance with the continuously varied valve timing.

What is claimed is:

1. A knocking control system for an internal combustion engine having inlet valves and exhaust valves, at least one of said inlet valves and said exhaust valves having valve timing thereof controlled by valve timing control means depending on operating conditions of said engine, the system comprising:
valve timing detecting means for detecting the valve timing controlled by said valve timing control means;
knocking parameter detecting means for detecting a detection parameter indicative of knocking occurring in said engine;
knocking discriminating means for determining wheter or not knocking has occurred in said engine on the basis of said detection parameter detected by said knocking parameter means and at least one discrimination parameter;
knocking control means responsive to an output from said knocking discriminating means indicative of a determination result that knocking has occured, for controlling an operation of said engine by the use of at least one control parameter; and
paremeter value selecting means for selecting a value of at least one of said at least one discimination parameter and said at least one control parameter, which corresponds to the valve timing detected by said valve timing detecting means.

2. A knocking control system as claimed in claim 1, wherein said detection parameter detected by said knocking parameter detecting means is a level of vibration of said engine, said vibration comprising a knocking component and a noise component, said knocking discriminating means setting a knocking discrimination level on the basis of a level of said noise component and said at least one discrimination parameter, in a manner depending upon the valve timing controlled by said valve timing control means, and determining that knocking has occurred when said knocking component has a level higher than said knocking discrimination level.

3. a knocking control system as claimed in claim 2, wherein said at least one discrimination parameter includes correction terms ($G_L$, $G_H$, $OS_L$, $OS_H$) set to such values as to obtain said knocking discrimination level irrespective of the valve timing controlled by said valve timing control means, by being multiplied by and added to the level of said noise component, respectively.

4. A knocking control system as claimed in claim 3, wherein said valve timing control means controls the valve timing to low speed valve timing suitable for a low engine rotational speed region and high speed valve timing suitable for a high engine rotational speed region, said correction terms comprising first correction terms ($G_L$, $OS_L$) for said low speed valve timing and second correction terms ($G_H$, $OS_H$) for said high speed valve timing, said parameter value selecting means selecting said first correction terms or said second correction terms depending on the valve timing detected by said valve timing detection means.

5. A knocking control system as claimed in claim 4, wherein said first correction terms and said second correction terms increase as at least one of the rotational speed of said engine and load on said engine increases.

6. a knocking control system as claimed in claim 1, wherein said knocking control means comprises ignition timing control means for varying ignition timing of said engine.

7. A knocking control system as claimed in claim 6, wherein said ignition timing control means is responsive to an output from said knocking discrimination means indicating that knocking has occurred, for retarding the ignition timing of said engine by a predetermined retarding amount ($\Delta\theta_{RD}$) as said at least one control parameter.

8. A knocking control system as claimed in claim 7, wherein said parameter value selecting means selects a value of said predetermined retarding amount corresponding to the valve timing detected by said valve timing detection means.

9. A knocking control system as claimed in claim 8, wherein said valve timing control means control the valve timing to low speed valve timing suitable for a low engine rotational speed region and high speed valve timing suitable for a high engine rotational speed region, said predetemined retarding amount ($\Delta\theta_{RD}$) comprising a first predetermined retarding amount for the low speed valve timing and a second predetermined retading amount for the high speed valve timing, said parameter value selecting means selecting said first predetermined retarding amount or said second predetermined retarding amount depending on the valve timing detected by said valve timing detection means.

10. A knocking control system as claimed in claim 9, wherein said ignition timing control means sets the ignition timing of said engine to a predetermined retarding limit value ($\theta ig_{KNRD}$) as said at least one control parameter when the ignition timing retarded by said predetermined retarding amount ($\Delta\theta_{RD}$) exceeds said predetermined retarding limit value.

11. A knocking control system as claimed in claim 10, wherein said predetermined retarding limit value ($\theta ig_{KNRD}$) comprises a first predetermined retarding limit value for the low speed valve timing and second predetermined retarding limit value for the high speed valve timing, said parameter value selecting means selecting said first predetermined retarding limit value or said second predetermined retarding limit value depending on the valve timing detecting by said valve timing detection means.

12. A knocking control system as claimed in claim 6, wherein said ignition timing control means is responsive to an output from said knocking discrimination means indicating that knocking does not occur, for advancing the ignition timing of said engine by a predetermined advancing amount ($\Delta\theta_{AV}$) as said at least one control parameter.

13. A knocking control system as claimed in claim 12, wherein said parameter value selecting means selects a value of said predetermined advancing amount corresponding to the valve timing detected by said valve timing detection means.

14. A knocking control system as claimed in claim 13, wherein said valve timing control means can control the valve timing to low speed valve timing suitable for a low engine rotational speed region and high speed valve timing suitable for a high engine rotational speed region, said predetermined advancing amount ($\Delta\theta_{AV}$) comprising a first predetermined advancing amount for the low speed valve timing and a second predetermined advancing amount for the high speed valve timing, said parameter value selecting means selecting said first predetermined advancing amount or said second predetermined advancing amount depending on the valve timing detected by said valve timing detection means.

15. A knocking control system as claimed in claim 14, wherein said ignition timing control means sets the ignition timing of said engine to a predetermined advancing limit value ($\theta ig_{KNAV}$) as said at least one control parameter when the ignition timing advanced by said predetermined advancing amount ($\Delta\theta_{AV}$) exceeds said predetermined advancing limit value.

16. a knocking control system as claimed in claim 15, wherein said predetermined advancing limit value ($\theta ig_{KNAV}$) comprises a first predetermined advacing limit value for the low speed valve timing and second predetermined advancing limit value for the high speed valve timing, said parameter value selecting means selecting said first predetermined advancing limit value or said second predetermined advancing limit value depending on the valve timing detected by said valve timing detection means.

17. a knocking control system as claimed in claim 13, including means for generating a pulse at each of predetermined crank angles of said engine, and means for determining the number of generated pulses depending upon at least one engine operating parameter, and wherein said ignition timing control means advances the ignition timing whenever a time period corresponding to the determined number of generated pulses has elapsed.

18. A knocking control system as claimed in claim 1, wherein said valve timing control means selects a first map for determining low speed valve timing suitable for a low engine rotational speed region when a first predetermined condition is fulfilled, and selects a second map for determining hign speed valve timing suitable for high engine rotational speed region when a second predetermined condition is fulfilled, said valve timing detecting means detecting the valve timing controlled by said valve timing control means, depending upon whether said first map or said second map has beemn selected.

* * * * *

UNITED STATES PATENT AND TRADEMARK OFFICE
CERTIFICATE OF CORRECTION

PATENT NO.   : 4,960,095
DATED        : October 2, 1990
INVENTOR(S)  : Koike et al.

It is certified that error appears in the above-identified patent and that said Letters Patent is hereby corrected as shown below:

On the cover page, Item [75], "Tsao" should read --Isao--.

Signed and Sealed this

Twenty-eighth Day of April, 1992

Attest:

HARRY F. MANBECK, JR.

*Attesting Officer*     *Commissioner of Patents and Trademarks*